(12) United States Patent
Seto et al.

(10) Patent No.: US 10,949,075 B2
(45) Date of Patent: Mar. 16, 2021

(54) APPLICATION COMMAND CONTROL FOR SMALL SCREEN DISPLAY

(71) Applicant: Microsoft Technology Licensing, LLC, Redmond, WA (US)

(72) Inventors: Julie Seto, Duvall, WA (US); Maya Rodrig, Seattle, WA (US); Jon Bell, Seattle, WA (US); Darron Stepanich, Seattle, WA (US); Erez Kikin Gil, Bellevue, WA (US); Derek Snook, Redmond, WA (US); Hongrui Zhang, Redmond, WA (US); Han-Yi Shaw, Redmond, WA (US); Matthew Vogel, Seattle, WA (US); Ramy Bebawy, Santa Clara, CA (US); Sunder Raman, San Jose, CA (US); Choon-mun Hooi, Redwood, CA (US); Vlad Riscutia, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/640,573

(22) Filed: Mar. 6, 2015

(65) Prior Publication Data
US 2016/0132203 A1 May 12, 2016

Related U.S. Application Data

(60) Provisional application No. 62/076,368, filed on Nov. 6, 2014.

(51) Int. Cl.
*G06F 3/0485* (2013.01)
*G06F 3/0482* (2013.01)
(Continued)

(52) U.S. Cl.
CPC .......... *G06F 3/0485* (2013.01); *G06F 3/0482* (2013.01); *G06F 3/04842* (2013.01); *G06F 3/04886* (2013.01); *G06F 9/451* (2018.02)

(58) Field of Classification Search
CPC .. G06F 3/0485; G06F 3/0482; G06F 3/04842; G06F 3/04886; G06F 9/451
See application file for complete search history.

(56) References Cited

U.S. PATENT DOCUMENTS

| 5,371,844 A | 12/1994 | Andrew |
| 5,420,605 A * | 5/1995 | Vouri ...................... G09G 5/02 |
| | | 345/428 |

(Continued)

FOREIGN PATENT DOCUMENTS

| CN | 1735856 A | 2/2006 |
| CN | 1790243 A | 6/2006 |

(Continued)

OTHER PUBLICATIONS

Paul McFedries, "Windows 7 Visual Quick Tips", Pub. Date: Oct. 5, 2009, Publisher: Visual, Print ISBN: 978-0-470-52117-5, p. 32-33.*

(Continued)

*Primary Examiner* — Anil K Bhargava
(74) *Attorney, Agent, or Firm* — NovoTechIP International PLLC

(57) ABSTRACT

Examples of the present disclosure describe application command control for small screen display. When detecting a display width associated with a processing device is equal to or less than a threshold value, the processing device launches an application command control programmed for display on small screens. The application command control interfaces with an application and comprises a plurality of top-level palettes and a plurality of drill-in palettes programmed for the application. A top-level palette for the
(Continued)

application is vertically scrollable and comprises a collection of rows comprising one or more selectable command elements. A row of the one or more command elements of the top-level palette comprises a drill-in feature that when selected presents a drill-in palette. A drill-in palette is vertically scrollable and comprises one or more rows of selectable command elements.

20 Claims, 23 Drawing Sheets

(51) Int. Cl.
G06F 3/0488 (2013.01)
G06F 3/0484 (2013.01)
G06F 9/451 (2018.01)

(56) References Cited

U.S. PATENT DOCUMENTS

| | | | |
|---|---|---|---|
| 5,499,334 | A | 3/1996 | Staab |
| 5,657,049 | A | 8/1997 | Ludolph et al. |
| 5,666,498 | A | 9/1997 | Amro |
| 5,760,772 | A | 6/1998 | Austin |
| 5,796,401 | A | 8/1998 | Winer |
| 5,886,694 | A | 3/1999 | Breinberg et al. |
| 5,920,315 | A | 7/1999 | Santos-Gomez |
| 6,018,346 | A | 1/2000 | Moran et al. |
| 6,300,947 | B1 | 10/2001 | Kanevsky |
| 6,335,743 | B1 | 1/2002 | Owings |
| 6,342,907 | B1* | 1/2002 | Petty .................. G06F 8/38 715/708 |
| 6,433,801 | B1 | 8/2002 | Moon |
| 6,734,882 | B1* | 5/2004 | Becker ............. G06F 3/0482 715/744 |
| 6,791,581 | B2 | 9/2004 | Novak et al. |
| 6,950,993 | B2 | 9/2005 | Breinberg |
| 6,978,473 | B1 | 12/2005 | Nsonwu et al. |
| 7,028,306 | B2 | 4/2006 | Boloker et al. |
| 7,395,500 | B2 | 7/2008 | Whittle |
| 7,418,670 | B2 | 8/2008 | Goldsmith |
| 7,432,928 | B2 | 10/2008 | Shaw et al. |
| 7,574,669 | B1 | 8/2009 | Braun |
| 7,735,018 | B2 | 6/2010 | Bakhash |
| 7,877,703 | B1 | 1/2011 | Fleming |
| 7,949,954 | B1* | 5/2011 | Jezek, Jr. ............. G06F 3/048 715/800 |
| 8,059,101 | B2 | 11/2011 | Westerman et al. |
| 8,078,979 | B2 | 12/2011 | Howard |
| 8,085,265 | B2 | 12/2011 | Chen et al. |
| 8,185,844 | B2 | 5/2012 | Tsai |
| 8,276,069 | B2 | 9/2012 | Chen et al. |
| 8,392,836 | B1* | 3/2013 | Bau .................... G06Q 10/107 715/739 |
| 8,478,245 | B2* | 7/2013 | Carion ............... G06F 9/4443 455/414.1 |
| 8,631,350 | B2* | 1/2014 | Lepage ............. G06F 3/0482 715/810 |
| 8,713,476 | B2 | 4/2014 | Martyn |
| 8,799,325 | B2 | 8/2014 | Callens et al. |
| 8,810,605 | B2 | 8/2014 | Park et al. |
| 8,881,032 | B1 | 11/2014 | Weber et al. |
| 8,904,286 | B2* | 12/2014 | Lee .................... G06F 3/0482 715/708 |
| 8,937,636 | B2 | 1/2015 | Mock |
| 9,015,624 | B2 | 4/2015 | Radtke et al. |
| 9,021,371 | B2 | 4/2015 | Mock |
| 9,160,915 | B1 | 10/2015 | Davies et al. |
| 9,232,043 | B2 | 1/2016 | Park |
| 9,274,691 | B2 | 3/2016 | Coe et al. |
| 9,360,998 | B2 | 6/2016 | Bauder et al. |
| 9,652,109 | B2 | 5/2017 | Borzello et al. |
| 9,658,741 | B2* | 5/2017 | Pauly ................. G06F 3/04842 |
| 9,721,034 | B2 | 8/2017 | Moore et al. |
| 2002/0101450 | A1 | 8/2002 | Magendanz et al. |
| 2002/0103817 | A1 | 8/2002 | Novak et al. |
| 2002/0109718 | A1* | 8/2002 | Mansour ............... G06F 9/4445 715/744 |
| 2002/0126142 | A1 | 9/2002 | Hodgkinson |
| 2003/0063120 | A1* | 4/2003 | Wong .................... G06F 9/4443 715/746 |
| 2003/0067489 | A1* | 4/2003 | Candy Wong .......... H04L 67/36 715/765 |
| 2003/0070061 | A1* | 4/2003 | Wong ....................... G06F 8/38 712/220 |
| 2003/0146927 | A1* | 8/2003 | Crow ..................... G06F 3/048 715/716 |
| 2004/0056894 | A1 | 3/2004 | Zaika et al. |
| 2004/0075693 | A1* | 4/2004 | Moyer .................. G06F 3/0482 715/810 |
| 2004/0119745 | A1 | 6/2004 | Bartek et al. |
| 2004/0153973 | A1 | 8/2004 | Horwitz |
| 2004/0162060 | A1 | 8/2004 | Hara et al. |
| 2004/0163046 | A1* | 8/2004 | Chu ..................... H04L 67/36 715/251 |
| 2004/0223004 | A1 | 11/2004 | Lincke et al. |
| 2004/0268259 | A1 | 12/2004 | Rockey et al. |
| 2005/0054384 | A1* | 3/2005 | Pasquale ............. G06F 3/0482 455/566 |
| 2005/0055645 | A1 | 3/2005 | Matthews et al. |
| 2005/0066037 | A1* | 3/2005 | Song ................. G06F 17/30861 709/227 |
| 2005/0076309 | A1* | 4/2005 | Goldsmith ............ G06F 3/0482 715/811 |
| 2005/0246647 | A1 | 11/2005 | Beam et al. |
| 2006/0020899 | A1 | 1/2006 | Gusmorino et al. |
| 2006/0082518 | A1 | 4/2006 | Ram |
| 2006/0101354 | A1* | 5/2006 | Hashimoto ......... G06F 3/04845 715/863 |
| 2006/0236264 | A1* | 10/2006 | Cain .................... G06F 3/0481 715/788 |
| 2006/0284893 | A1 | 12/2006 | Hlad |
| 2007/0124669 | A1 | 5/2007 | Makela |
| 2007/0266335 | A1 | 11/2007 | Zielinski et al. |
| 2008/0002115 | A1 | 1/2008 | Polak |
| 2008/0005701 | A1 | 1/2008 | Park et al. |
| 2008/0163112 | A1 | 7/2008 | Lee et al. |
| 2008/0178073 | A1 | 7/2008 | Gao |
| 2008/0244440 | A1 | 10/2008 | Bailey et al. |
| 2008/0273297 | A1 | 11/2008 | Kumar |
| 2009/0058885 | A1 | 3/2009 | Park et al. |
| 2009/0192849 | A1 | 7/2009 | Hughes et al. |
| 2009/0222767 | A1* | 9/2009 | Matthews ............. G06F 3/0482 715/835 |
| 2009/0260022 | A1 | 10/2009 | Louch et al. |
| 2009/0278806 | A1 | 11/2009 | Duarte et al. |
| 2009/0282360 | A1 | 11/2009 | Park et al. |
| 2009/0288013 | A1 | 11/2009 | Zhang et al. |
| 2009/0303676 | A1 | 12/2009 | Behar et al. |
| 2009/0319953 | A1 | 12/2009 | Tsai |
| 2010/0060587 | A1 | 3/2010 | Freund |
| 2010/0122215 | A1 | 5/2010 | MacGregor |
| 2010/0138767 | A1* | 6/2010 | Wang .................. G06F 3/0481 715/769 |
| 2010/0138778 | A1 | 6/2010 | Dewan et al. |
| 2010/0138780 | A1 | 6/2010 | Marano et al. |
| 2010/0251152 | A1* | 9/2010 | Cho ..................... G06F 1/1626 715/765 |
| 2010/0269062 | A1* | 10/2010 | Kobylinski ........... G06F 3/0485 715/781 |
| 2010/0274869 | A1* | 10/2010 | Warila .................... G06F 8/24 709/217 |
| 2010/0302278 | A1 | 12/2010 | Shaffer et al. |
| 2011/0007009 | A1 | 1/2011 | Ishihara et al. |
| 2011/0016431 | A1 | 1/2011 | Grosz et al. |
| 2011/0025706 | A1 | 2/2011 | Etelapera |
| 2011/0041092 | A1 | 2/2011 | Zhang |
| 2011/0107227 | A1 | 5/2011 | Rempell et al. |
| 2011/0119628 | A1* | 5/2011 | Carter .................. G06F 3/0482 715/812 |

(56) References Cited

U.S. PATENT DOCUMENTS

| | | |
|---|---|---|
| 2011/0126154 A1* | 5/2011 | Boehler .............. G06F 3/0237 715/811 |
| 2011/0179373 A1 | 7/2011 | Moore et al. |
| 2011/0202882 A1 | 8/2011 | Forstall et al. |
| 2011/0214077 A1 | 9/2011 | Singh et al. |
| 2011/0219332 A1 | 9/2011 | Park |
| 2011/0242750 A1 | 10/2011 | Oakley |
| 2011/0307804 A1 | 12/2011 | Spierer |
| 2012/0017172 A1 | 1/2012 | Sheth et al. |
| 2012/0030584 A1 | 2/2012 | Bian |
| 2012/0054671 A1 | 3/2012 | Thompson et al. |
| 2012/0062688 A1 | 3/2012 | Shen et al. |
| 2012/0117506 A1 | 5/2012 | Koch et al. |
| 2012/0127206 A1 | 5/2012 | Thompson et al. |
| 2012/0216139 A1 | 8/2012 | Ording et al. |
| 2012/0240056 A1 | 9/2012 | Webber |
| 2012/0265978 A1 | 10/2012 | Shenfield et al. |
| 2012/0266069 A1 | 10/2012 | Moshiri et al. |
| 2012/0287114 A1 | 11/2012 | Hallock et al. |
| 2013/0019150 A1 | 1/2013 | Zarom |
| 2013/0019182 A1* | 1/2013 | Gil .................. G06F 3/0482 715/738 |
| 2013/0019183 A1* | 1/2013 | Reeves .............. G06F 9/4443 715/745 |
| 2013/0019206 A1 | 1/2013 | Kotler et al. |
| 2013/0024778 A1* | 1/2013 | Reeves .............. G06F 3/1423 715/744 |
| 2013/0024851 A1 | 1/2013 | Firman et al. |
| 2013/0036443 A1 | 2/2013 | Kandanala et al. |
| 2013/0050141 A1 | 2/2013 | Park et al. |
| 2013/0084920 A1 | 4/2013 | Sawhney |
| 2013/0113720 A1 | 5/2013 | Van Eerd et al. |
| 2013/0117713 A1 | 5/2013 | Bauder |
| 2013/0120302 A1* | 5/2013 | Kang .................. G06F 3/041 345/173 |
| 2013/0125049 A1 | 5/2013 | Dhawan |
| 2013/0159417 A1 | 6/2013 | Meckler et al. |
| 2013/0159902 A1 | 6/2013 | Kwak et al. |
| 2013/0174066 A1 | 7/2013 | Felix |
| 2013/0174079 A1 | 7/2013 | Morley et al. |
| 2013/0179840 A1 | 7/2013 | Fisher et al. |
| 2013/0191781 A1 | 7/2013 | Radakovitz et al. |
| 2013/0212487 A1 | 8/2013 | Cote |
| 2013/0212535 A1 | 8/2013 | Kim |
| 2013/0222434 A1 | 8/2013 | Park et al. |
| 2013/0227413 A1 | 8/2013 | Thorsander et al. |
| 2013/0227454 A1 | 8/2013 | Thorsander et al. |
| 2013/0227470 A1 | 8/2013 | Thorsander et al. |
| 2013/0227482 A1 | 8/2013 | Thorsander et al. |
| 2013/0227483 A1 | 8/2013 | Thorsander et al. |
| 2013/0227490 A1 | 8/2013 | Thorsander et al. |
| 2013/0268875 A1* | 10/2013 | Han .................. G06F 3/0481 715/769 |
| 2013/0278708 A1 | 10/2013 | Mock |
| 2013/0283185 A1 | 10/2013 | Mock |
| 2014/0013271 A1 | 1/2014 | Moore et al. |
| 2014/0026099 A1 | 1/2014 | Andersson Reimer et al. |
| 2014/0033110 A1 | 1/2014 | Darden |
| 2014/0040781 A1 | 2/2014 | Epstein |
| 2014/0055495 A1 | 2/2014 | Kim et al. |
| 2014/0075367 A1 | 3/2014 | Abuelsaad et al. |
| 2014/0108936 A1 | 4/2014 | Khosropour et al. |
| 2014/0143683 A1 | 5/2014 | Underwood et al. |
| 2014/0143708 A1 | 5/2014 | Yang et al. |
| 2014/0157163 A1 | 6/2014 | Strutin-Belinoff et al. |
| 2014/0157390 A1 | 6/2014 | Lurey et al. |
| 2014/0189595 A1 | 7/2014 | Waldman et al. |
| 2014/0201672 A1* | 7/2014 | Borzello .............. G06F 3/0482 715/779 |
| 2014/0223347 A1 | 8/2014 | Seo et al. |
| 2014/0282055 A1 | 9/2014 | Engel et al. |
| 2014/0282178 A1* | 9/2014 | Borzello .............. G06F 3/0484 715/771 |
| 2014/0282243 A1 | 9/2014 | Eye et al. |
| 2014/0282254 A1 | 9/2014 | Feiereisen et al. |
| 2014/0304615 A1 | 10/2014 | Coe |
| 2014/0310643 A1 | 10/2014 | Karmanenko et al. |
| 2014/0325054 A1 | 10/2014 | Agrawal et al. |
| 2014/0325345 A1* | 10/2014 | Vano .................. G06F 17/211 715/236 |
| 2014/0325367 A1 | 10/2014 | Fear |
| 2014/0337744 A1* | 11/2014 | She .................. G06F 17/3028 715/739 |
| 2014/0340591 A1 | 11/2014 | Chang et al. |
| 2015/0033188 A1* | 1/2015 | Devi .................. G06F 3/0482 715/824 |
| 2015/0061968 A1 | 3/2015 | Park et al. |
| 2015/0074518 A1* | 3/2015 | Rumsey .............. G06F 17/248 715/235 |
| 2015/0082242 A1* | 3/2015 | Antipa .............. G06F 3/0482 715/811 |
| 2015/0088669 A1 | 3/2015 | Kwak |
| 2015/0143271 A1 | 5/2015 | Sanders et al. |
| 2015/0169197 A1* | 6/2015 | Muto .................. G06F 3/0481 715/798 |
| 2015/0169219 A1 | 6/2015 | Koenig et al. |
| 2015/0277682 A1 | 10/2015 | Kaufthal et al. |
| 2015/0277726 A1 | 10/2015 | Maloney |
| 2015/0286359 A1 | 10/2015 | Oakley et al. |
| 2016/0132195 A1 | 5/2016 | Seto et al. |
| 2016/0132234 A1 | 5/2016 | Riscutia et al. |
| 2016/0132301 A1 | 5/2016 | Riscutia et al. |
| 2016/0132992 A1 | 5/2016 | Rodrig et al. |
| 2016/0209973 A1 | 7/2016 | Kaufthal et al. |
| 2016/0209994 A1 | 7/2016 | Kaufthal et al. |
| 2016/0292133 A1 | 10/2016 | Elings et al. |
| 2016/0320938 A9 | 11/2016 | Massand |
| 2016/0351047 A1 | 12/2016 | Han et al. |
| 2016/0364219 A9 | 12/2016 | Grey et al. |
| 2017/0329495 A1 | 11/2017 | Feiereisen |

FOREIGN PATENT DOCUMENTS

| | | |
|---|---|---|
| CN | 101278252 A | 10/2008 |
| EP | 1873623 | 1/2008 |
| EP | 2312427 | 4/2011 |
| WO | WO 2011/153623 | 12/2011 |
| WO | 2013/0135815 | 9/2013 |
| WO | 2014117241 | 8/2014 |
| WO | WO 2014152149 | 9/2014 |

OTHER PUBLICATIONS

CCP Command Palette, Retrieved on: Sep. 16, 2015, Available at: https://chrome.google.com/webstore/detail/ccp-command-palette/cofhcenpbdpcjghambdchdmdlapaiddh?hl=en, 4 pgs.

Roth, Corey, "Using OneNote with the Surface Pro 3", Published on: Jul. 14, 2014, Available at: http://blogs.msdn.com/b/mvpawardprogram/archive/2014/07/14/using-onenote-with-the-surface-pro-3.aspx, 12 pgs.

Singh, Gursimranjeet, "ReBoard: Revolutionary Keyboard", Published on: Sep. 12, 2015, Available at: https://itunes.apple.com/us/app/reboard-revolutionary-keyboard/id984982881?mt=8, 4 pgs.

U.S. Appl. No. 13/834,496, Office Action dated Oct. 1, 2015, 17 pgs.

PCT International Search Report and Written Opinion in International Application PCT/US2015/059323, dated Feb. 10, 2016, 12 pgs.

U.S. Appl. No. 13/834,496, Amendment dated Feb. 29, 2016, 5 pgs.

U.S. Appl. No. 13/834,496, Office Action dated Apr. 22, 2016, 17 pgs.

U.S. Appl. No. 13/834,496, Amendment and Response filed Jun. 29, 2016, 10 pgs.

PCT International Second Written Opinion in International Application PCT/US2015/059323, dated Sep. 13, 2016, 7 pgs.

U.S. Appl. No. 13/834,496, Office Action dated Sep. 9, 2016, 18 pages.

"Multi Swipe Controls Template", Retrieved at «http://www.deepblueapps.com/multi-swipe-controls-template/», Retrieved Date: Mar. 5, 2013, pp. 3.

(56) References Cited

OTHER PUBLICATIONS

"Nexus 4 Guidebook", Retrieved at «http://static.googleusercontent.com/external_content/untrusted_dlcp/www.google.com/en//help/hc/images/android/android_ug_42/Nexus-4-Guidebook.pdf», Retrieved Date: Mar. 5, 2013, pp. 235.
"Prioritizing Your Data", Retrieved at «http://technet.microsoft.com/en-us/library/cc749544(v=ws.10).aspx», Jun. 11, 2010, pp. 3.
"Swipe for Action", Retrieved at «http://www.androidpatterns.com/uap_pattern/swipe-for-action», Retrieved date Mar. 12, 2013, pp. 6.
"Touch Interaction Design (Windows Store apps) (Windows)", Retrieved at «http://msdn.microsoft.com/en-in/library/ windows/apps/hh465415.aspx», Retrieved Date: Mar. 5, 2013, pp. 13.
Roth, et al., "Bezel Swipe: Conflict-Free Scrolling and Multiple Selection on Mobile Touch Screen Devices", Retrieved at «http://www.volkerroth.com/download/Roth2009a.pdf», In Proceedings of the SIGCHI Conference on Human Factors in Computing Systems, Apr. 4, 2009, pp. 4.
U.S. Appl. No. 10/252,068, Advisory Action dated Mar. 8, 2007, 3 pgs.
U.S. Appl. No. 10/252,068, Advisory Action dated Jul. 31, 2009, 3 pgs.
U.S. Appl. No. 10/252,068, Amendment and Response filed Jan. 31, 2009, 26 pgs.
U.S. Appl. No. 10/252,068, Amendment and Response filed Jan. 6, 2010, 16 pgs.
U.S. Appl. No. 10/252,068, Amendment and Response filed Feb. 14, 2007, 10 pgs.
U.S. Appl. No. 10/252,068, Amendment and Response filed Mar. 14, 2007, 15 pgs.
U.S. Appl. No. 10/252,068, Amendment and Response filed Jul. 11, 2009, 26 pgs.
U.S. Appl. No. 10/252,068, Amendment and Response filed Jul. 26, 2010, 36 pgs.
U.S. Appl. No. 10/252,068, Amendment and Response filed Jul. 9, 2008, 20 pgs.
U.S. Appl. No. 10/252,068, Amendment and Response filed Aug. 12, 2009, 14 pgs.
U.S. Appl. No. 10/252,068, Amendment and Response filed Sep. 14, 2007, 15 pgs.
U.S. Appl. No. 10/252,068, Amendment and Response filed Sep. 27, 2006, 22 pgs.
U.S. Appl. No. 10/252,068, Office Action dated Oct. 12, 2010, 18 pgs.
U.S. Appl. No. 10/252,068, Office Action dated Oct. 30, 2008, 15 pgs.
U.S. Appl. No. 10/252,068, Office Action dated Oct. 5, 2009, 17 pgs.
U.S. Appl. No. 10/252,068, Office Action dated Nov. 28, 2007, 13 pgs.
U.S. Appl. No. 10/252,068, Office Action dated Dec. 14, 2006, 9 pgs.
U.S. Appl. No. 10/252,068, Office Action dated Apr. 26, 2010, 17 pgs.
U.S. Appl. No. 10/252,068, Office Action dated May 11, 2009, 16 pgs.
U.S. Appl. No. 10/252,068, Office Action dated Jun. 14, 2007, 13 pgs.
U.S. Appl. No. 10/252,068, Office Action dated Jun. 27, 2006, 10 pgs.
U.S. Appl. No. 13/834,496, Amendment and Response filed Apr. 16, 2015, 8 pgs.
U.S. Appl. No. 13/834,496, Office Action dated Jan. 16, 2015, 17 pgs.
U.S. Appl. No. 13/834,496, Office Action dated Jun. 3, 2015, 15 pgs.
Zheng, Long, "Dissecting the Windows 8 Touch UI Demo from D9", Retrieved at «http://www.istartedsomething.com/20110602/dissecting-the-windows-8-touch-ui-demo-from-d9/», Jun. 2, 2011, pp. 26.
U.S. Appl. No. 13/834,496, Amendment after Final OA filed Aug. 3, 2015, 8 pgs.
U.S. Appl. No. 13/834,496, Advisory Action dated Aug. 20, 2015, 3 pgs.
"css3menu", Retrieved on: Jun. 17, 2015, Available at: http://css3menu.com/, 16 pgs.
"Guidelines for Supporting Multiple Screen Sizes", Retrieved on: Mar. 13, 2015, Available at: https://msdn.microsoft.com/en-in/library/windows/apps/hh465349.aspx, 6 pgs.
"Microsoft Office Apps for Android Mobile Phones", Published on: Jun. 15, 2015, Available at: http://www.askvg.com/review-microsoft-office-apps-for-android-mobile-phones/, 5 pgs.
"Quickstart: Control templates (XAML)", Retrieved on: Mar. 20, 2015, Available at: https://msdn.microsoft.com/en-us/library/windows/apps/xaml/hh465374.aspx, 6 pgs.
"Supporting Multiple Screens", Published on: Jul. 8, 2012, Available at: http://developer.android.com/guide/practices/screens_support.html, 26 pgs.
"Supporting Multiple Screens", Published on: Jul. 28, 2011, Available at: http://developer.android.com/guide/practices/screens_support.html, 16 pgs.
"View Office Documents on your Cell Phone", Retrieved on: Jun. 17, 2015, Available at: https://support.office.com/en-in/article/View-Office-documents-on-your-cell-phone-9c134bbf-7fa5-40ca-b379-2be5ff331504, 6 pgs.
"WPS Mobile Office for Android 7.0", Retrieved on: Jun. 17, 2015, 5 pgs, Available at: http://assistly-production.s3.amazonaws.com/179952/kb_article_attachments/48665/Android_QSG2_original.pdf?AWSAccessKeyId=AKIAJNSFWOZ6ZS23BMKQ&Expires=1435118587&Signature=p2GBars78GoAcuGZ5Pdr8iMEx1c%3D&response-content-disposition=filename%3D%22Android_QSG2.pdf%22&response-content-type=application%2Fpdf.
Birch, Nataly, "Vertical Navigation Implementation of Side Menu in Mobile Apps", Published on: Jul. 15, 2013, Available at: http://designmodo.com/vertical-side-menu-mobile-apps/, 17 pgs.
Chaize, Michael, "Adaptive UI: Mobile Vs Tablet", Published on: Jun. 24, 2011, Available at: http://www.riagora.com/2011/06/adaptive-ui-mobile-vs-tablet/, 7 pgs.
Gajos, Krzysztof Z., "Automatically Generating Personalized User Interfaces", In PhD Thesis, Jun. 20, 2010, 210 pages.
Gajosa, et al., "Automatically Generating Personalized User Interfaces with Supple", In Journal of Artificial Intelligence, vol. 174, Issue 12-13, Aug. 2010, 49 pages.
Kingsley, Allie, "15+ Best Free Navigation Menus", Published on: Mar. 17, 2015, Available at: http://designscrazed.org/best-free-navigation-menus/, 9 pgs.
Knowlton, Gray, "Using the New Office with Touch", Published on: Jul. 18, 2012, Available at: https://blogs.office.com/2012/07/18/using-the-new-office-with-touch/, 21 pgs.
Protalinski, Emil, "Microsoft Launches Word, Excel, and PowerPoint previews for Android Phones", Published on: May 19, 2015, Available at: http://venturebeat.com/2015/05/19/microsoft-launches-word-excel-and-powerpoint-for-android-phones/, 2 pgs.
Richardson, Jeff, "Review: Microsoft Office Mobile for iPhone", Published on: Jun. 18, 2013, Available at: http://www.iphonejd.com/iphone_jd/2013/06/review-microsoft-office-mobile-for-iphone.html, 6 pgs.
Richardson, Jeff, "Review: Microsoft Word for Iphone and Ipad—View and Edit Word Documents on any IOS Device", Published on: Nov. 7, 2014, Available at: http://www.iphonejd.com/iphone_jd/2014/11/review-microsoft-word.html, 11 pgs.
Thornton, Tessa, "Big Menus, Small Screens: Responsive, Multi-Level Navigation", Published on: Sep. 13, 2012, Available at: http://webdesign.tutsplus.com/tutorials/big-menus-small-screens-responsive-multi-level-navigation--webdesign-8452, 27 pgs.
"BCGControlBar Library for .NET—Summary", Published on: Feb. 7, 2007, Available at http://www.componentsource.com/products/bcgcontrolbar-net/sumary.html, 12 pgs.
Prospero, Michael A., "How to Use Control Center in iOS 7", Published on: Sep. 18, 2013, Available at http://blog.laptopmag.com/use-control-center-ios-7, 3 pgs.
Wilson, Mark, "3 Ways Bigger iPhones Will Change App Design", Published on: Sep. 18, 2014 Available at http://www.fastcodesign.com/3035890/innovation-by-design/3-ways-bigger-iphones-will-change-app-design, 9 pgs.

(56) References Cited

OTHER PUBLICATIONS

"Mobile", Retrieved on: Nov. 11, 2014, Available at http://help.board.com/Mobile.htm, 9 pgs.

"Split-screen User Interface", Retrieved on: Nov. 11, 2014, Available at http://www.uscellular.com/uscellular/pdf/samsung-note-2-split-screen.pdf, 1 page.

PCT International Preliminary Report on Patentability in PCT/US2015/059323, dated Jan. 20, 2017, 8 pages.

U.S. Appl. No. 13/834,496, Amendment and Response filed Dec. 1, 2016, 9 pages.

U.S. Appl. No. 13/834,496, Office Action dated Jan. 12, 2017, 20 pages.

U.S. Appl. No. 13/834,496, Amendment and Response filed Mar. 8, 2017, 8 pgs.

PCT International Search Report and Written Opinion in International Application PCT/US2016/054572, dated Feb. 28, 2017, 16 pgs.

U.S. Appl. No. 14/727,226, Office Action dated Jun. 22, 2017, 12 pages.

U.S. Appl. No. 13/834,496, Notice of Allowance dated Apr. 27, 2017, 14 pgs.

U.S. Appl. No. 14/726,868, Office Action dated Aug. 7, 2017, 22 pgs.

U.S. Appl. No. 14/727,226, Amendment and Response filed Sep. 22, 2017, 20 pages.

U.S. Appl. No. 13/834,496, Amendment after Allowance filed Jul. 21, 2017, 7 pgs.

U.S. Appl. No. 13/834,496, USPTO Response dated Sep. 20, 2017, 2 pgs.

U.S. Appl. No. 14/727,226, Office Action dated Dec. 13, 2017, 11 pages.

"Final Office Action Issued in U.S. Appl. No. 14/726,868", dated Jun. 7, 2018, 28 Pages.

U.S. Appl. No. 14/840,360, Office Action dated Apr. 9, 2018, 21 pages.

Demekis, Jim, "The Eyedropper Tool in Powerpoint", Aug. 27, 2013, pp. 1-4.

U.S. Appl. No. 14/727,226, Amendment and Response filed May 14, 2018, 19 pages.

U.S. Appl. No. 14/726,868, Amendment and Response filed Feb. 7, 2018, 22 pgs.

"Non Final Office Action Issued in U.S. Appl. No. 14/726,868", dated Jan. 4, 2019, 30 Pages.

<Khalilbeigi, et al., "FoldMe: Interacting with Double-sided Foldable Displays", In Proceedings of the Sixth International Conference on Tangible, Embedded and embodied Interaction, Feb. 19, 2012, 8 Pages.

"Non Final Office Action Issued in U.S. Appl. No. 14/727,226", dated Dec. 6, 2019, 13 Pages.

"Final Office Action Issued in U.S. Appl. No. 14/880,768", dated Nov. 18, 2019, 19 Pages.

"Non-Final Office Action Issued in U.S. Appl. No. 14/840,360", dated Sep. 27, 2019, 19 Pages.

"Final Office Action Issued in U.S. Appl. No. 14/727,226", dated Jul. 9, 2019, 10 Pages.

"How to use S Memo on the Samsung Galaxy S4", Retrieved from https://www.androidcentral.com/how-use-s-memo-samsung-galaxy-s4, Feb. 5, 2014, 11 Pages.

"Samsung Galaxy S4: How to Insert an Image into S Memo Note", Retrieved from https://www.youtube.com/watch?v=pceyMh0s9nE, Oct. 18, 2013, 21 Pages.

"Non Final Office Action Issued in U.S. Appl. No. 14/880,768", dated Mar. 21, 2019, 16 Pages.

"Final Office Action Issued in U.S. Appl. No. 14/726,868", dated Jun. 27, 2019, 26 Pages.

"Final Office Action Issued in U.S. Appl. No. 14/840,360", dated Jun. 20, 2019, 18 Pages.

"Office Action Issued in European Patent Application No. 15801540.4", dated May 29, 2019, 4 Pages.

U.S. Appl. No. 14/840,360, Office Action dated Nov. 29, 2018, 17 pages.

U.S. Appl. No. 14/727,226, Office Action dated Nov. 29, 2018, 10 pages.

"First Office Action and Search Report Issued in Chinese Patent Application No. 201580060247.5", dated Sep. 2, 2019, 11 Pages.

"Final Office Action Issued in U.S. Appl. No. 14/727,226", dated Aug. 12, 2020, 13 Pages.

"Non Final Office Action Issued in U.S. Appl. No. 14/840,360", dated Nov. 3, 2020, 19 Pages.

"Non Final Office Action Issued in U.S. Appl. No. 14/880,768", dated Jul. 1, 2020, 19 Pages.

"Second Office Action Issued in Chinese Patent Application No. 201580060247.5", dated Mar. 16, 2020, 8 Pages.

"Final Office Action Issued in U.S. Appl. No. 14/840,360", dated Apr. 20, 2020, 22 Pages.

"Office Action Issued in Indian Patent Application No. 201747013813", dated Nov. 20, 2020, 7 pages.

"Final Office Action Issued in U.S. Appl. No. 14/880,768", dated Jan. 8, 2021, 22 pages.

* cited by examiner

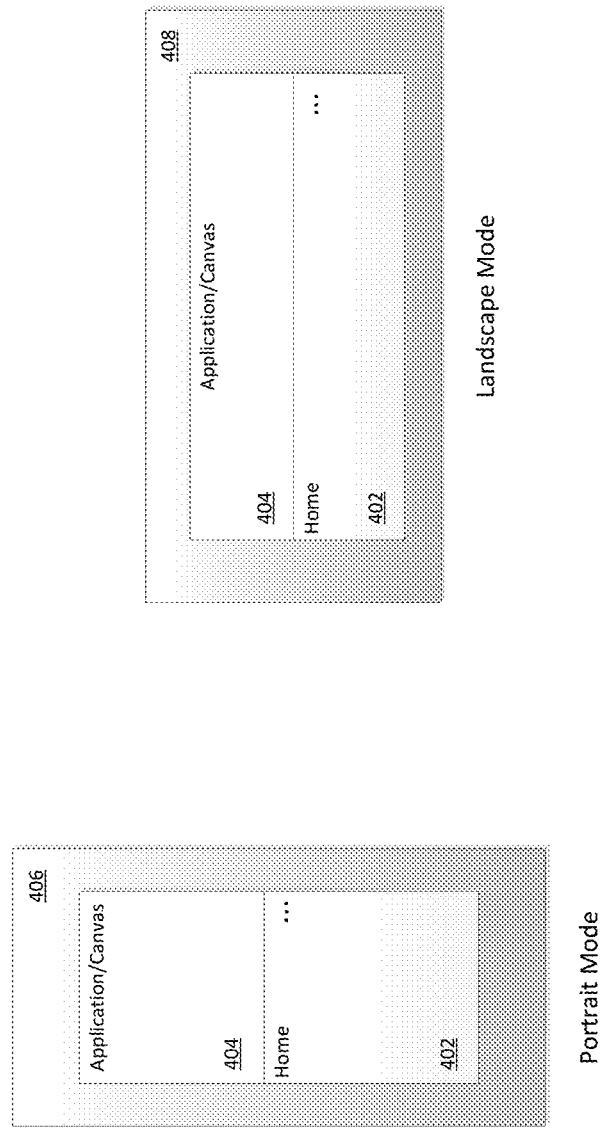

Examples of Open State Positioning for Application Command Control

US 10,949,075 B2

APPLICATION COMMAND CONTROL FOR SMALL SCREEN DISPLAY

PRIORITY

This application claims the benefit of U.S. Provisional Application No. 62/076,368, filed on Nov. 6, 2014, which is hereby incorporated by reference in its entirety.

BACKGROUND

Usable space on a display of a smaller screen processing device (e.g., mobile phone or tablet) is limited as compared with desktop devices. When developing graphical control elements for applications, developers do not typically consider screen size limitations in developing and programming of such graphical control elements. Functionality and usability issues are presented when many applications are run on smaller displays, such issues including graphical control elements not functioning properly (e.g., display, processing of actions/data and usability issues). Graphical control elements that are robust and include many elements/functions typically lose functionality when displayed under smaller screen-size constraints. It is with respect to this general technical area that the present application is directed.

SUMMARY

Examples of the present disclosure describe application command control for small-screens. When detecting a display width associated with a processing device is equal to or less than a threshold value, the processing device launches an application command control programmed for display on small screens. The application command control interfaces with an application and comprises a plurality of top-level palettes and a plurality of drill-in palettes programmed for the application. A top-level palette for the application is vertically scrollable and comprises a collection of rows comprising one or more selectable command elements. A row of one or more command elements of the top-level palette comprises a drill-in feature that when selected presents a drill-in palette. A drill-in palette is vertically scrollable and comprises one or more rows of selectable command elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4A is a diagram illustrating orientations for a processing device with which aspects of the present disclosure may be practiced.

DETAILED DESCRIPTION

Figure 1:
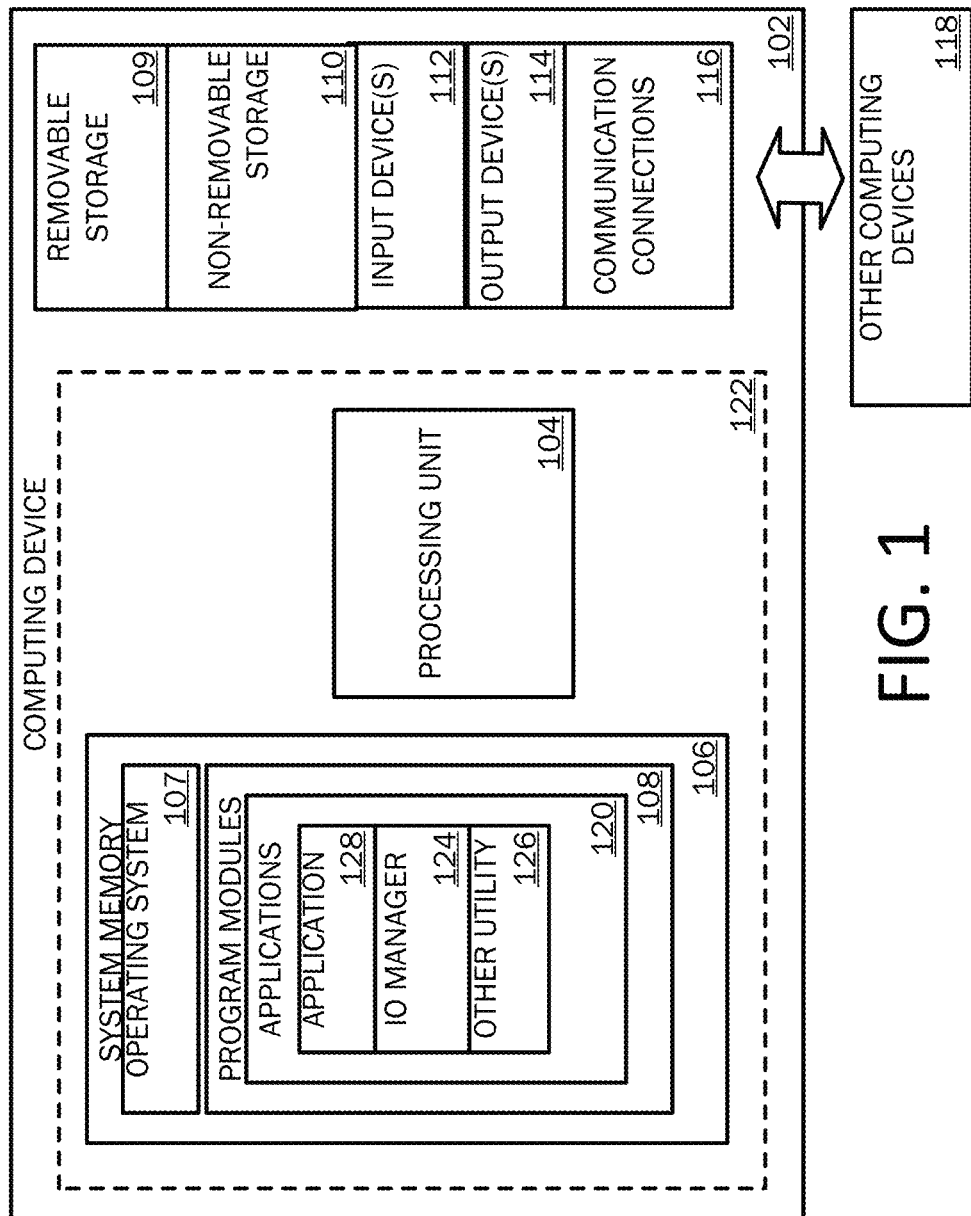
FIG. 1 is a block diagram illustrating an example of a computing device with which aspects of the present disclosure may be practiced.

Usable display space is at a premium for users of smaller screen devices. Users desire improved functionality and usability of applications on smaller screens rather than relying on larger devices that traditionally have more display space and greater processing capability. A user expects a device displaying an application on a small portion of a display to have functionality that is greater than or at least similar to that of a larger screen device. Users of small screen devices also expect familiarity with applications that they may use on larger screen devices.

Examples of the present disclosure describe application command control for small screens, for example, having a display width associated with a processing device that is equal to or less than a threshold value. As examples, the threshold value may relate to screen size including but not limited to a width of a display of a processing device (e.g., mobile device), an effective resolution of a display or a measurement related to a diagonal of a display of the processing device, and an operating size of a display window for an application executing on the processing device. Application command control is displayable on a display of a processing device in a form-factor appropriate manner, for example in a portrait or landscape view. The application command control hosts a majority of an application's command set, organized in a hierarchical structure of individual palettes, chunks, and commands. Further, the application command control may be programmed to dynamically interact with an application and display simultaneously with applications and/or user interface components such as a soft input panel (SIP) or on screen keyboard. In one example, the application command control may intelligently adapt based on content of an application (e.g., displayed or selected on an application canvas).

Positioning of the application command control may depend on a state of the application command control. Positioning and display of an application command control may also be affected by the applications interfacing with the application command control as well as other user interface features such as an SIP or other command container such as a pane or contextual menu as examples. In one example, the application command control may display on at least one portion of a display of a device running an application. For instance, an application command control may display on a bottom portion of a display while an application is running. However, an application command control may comprise multiple parts. For example, a part of the application command control may display at a bottom portion of a display while certain features related to the application command control may display at a top portion of a display while an application is running Size of the application command control may be programmed or variable. In an example open state, the application command control may be a half-screen control. In at least one example, palettes of an application command control are presented in a vertical layout and are vertically scrollable. Commands may be laid out in chunks that stack vertically on top of one another. Menus or palettes of an application command control may comprise top-level palettes (e.g., corresponding to groupings) and drill-in palettes correspond to overflows and drill-ins hosted in callouts.

A number of technical advantages are achieved based on the present disclosure including but not limited to: improved scalability and miniaturization of graphical control elements for applications e.g., less required space for GUI functionality, enhanced processing capability for graphical control elements on small screen devices, improved efficiency and usability for applications/graphical control elements on small screen devices, improved efficiency in navigation and access to control content, and improved visual presentation for user interaction, among other examples.

Figure 2A:
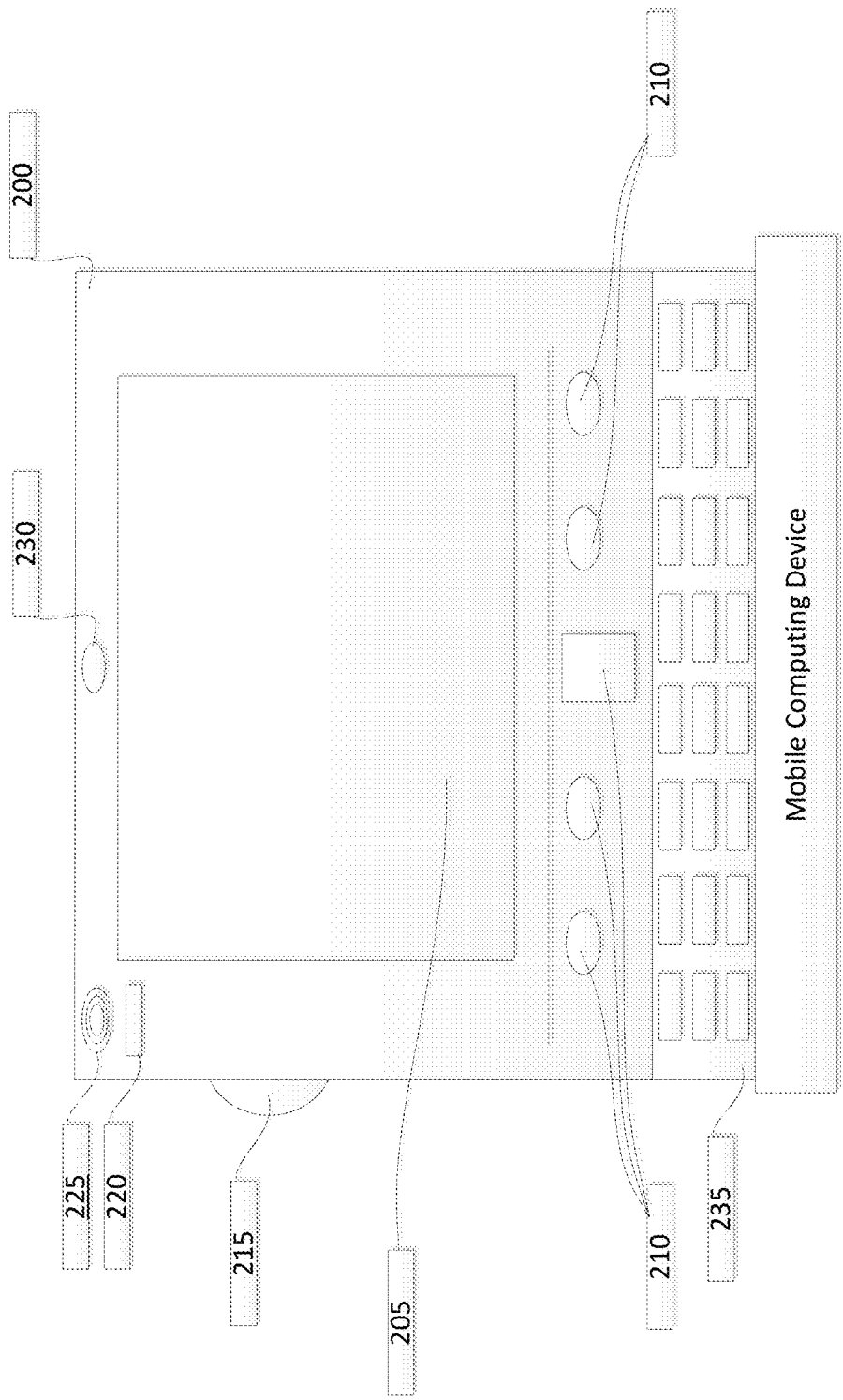
FIGS. 2A and 2B are simplified block diagrams of a mobile computing device with which aspects of the present disclosure may be practiced.
Figure 2B:
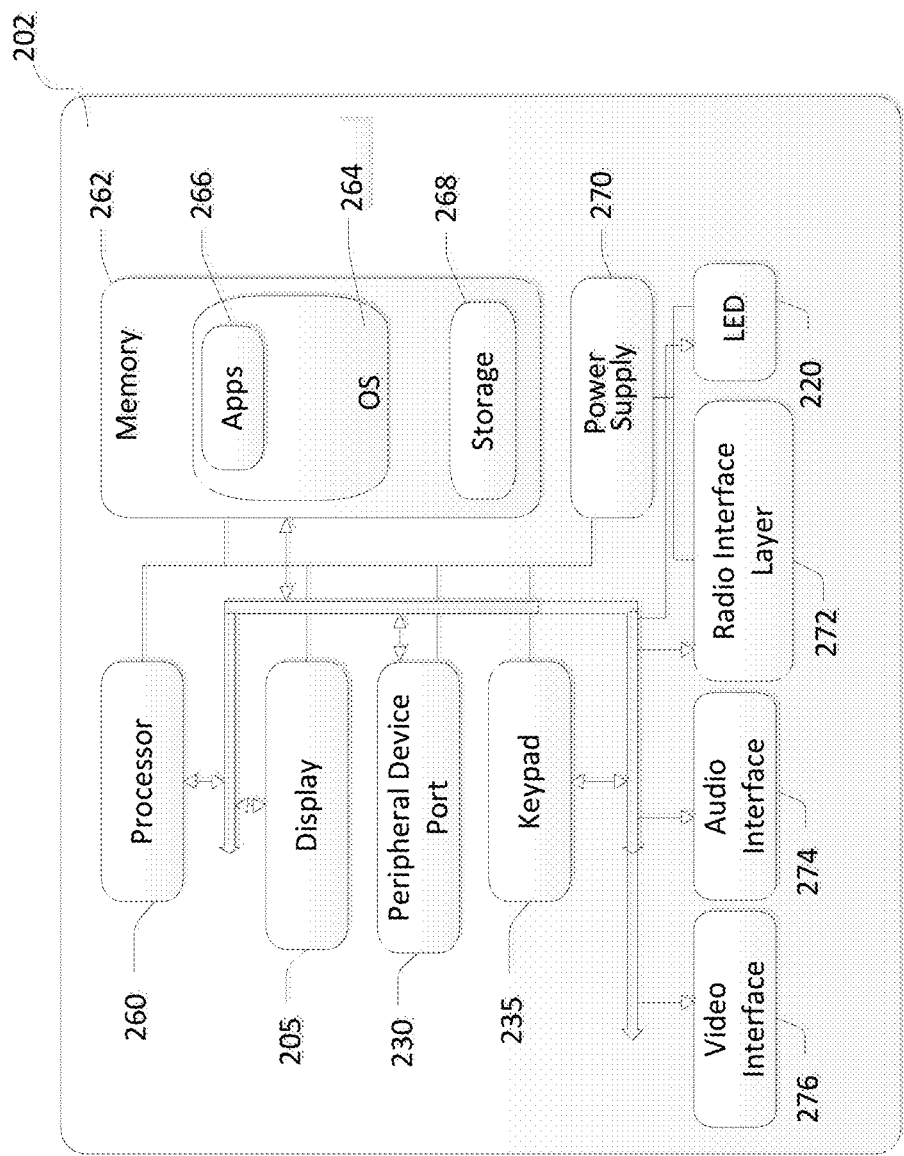
Figure 3:
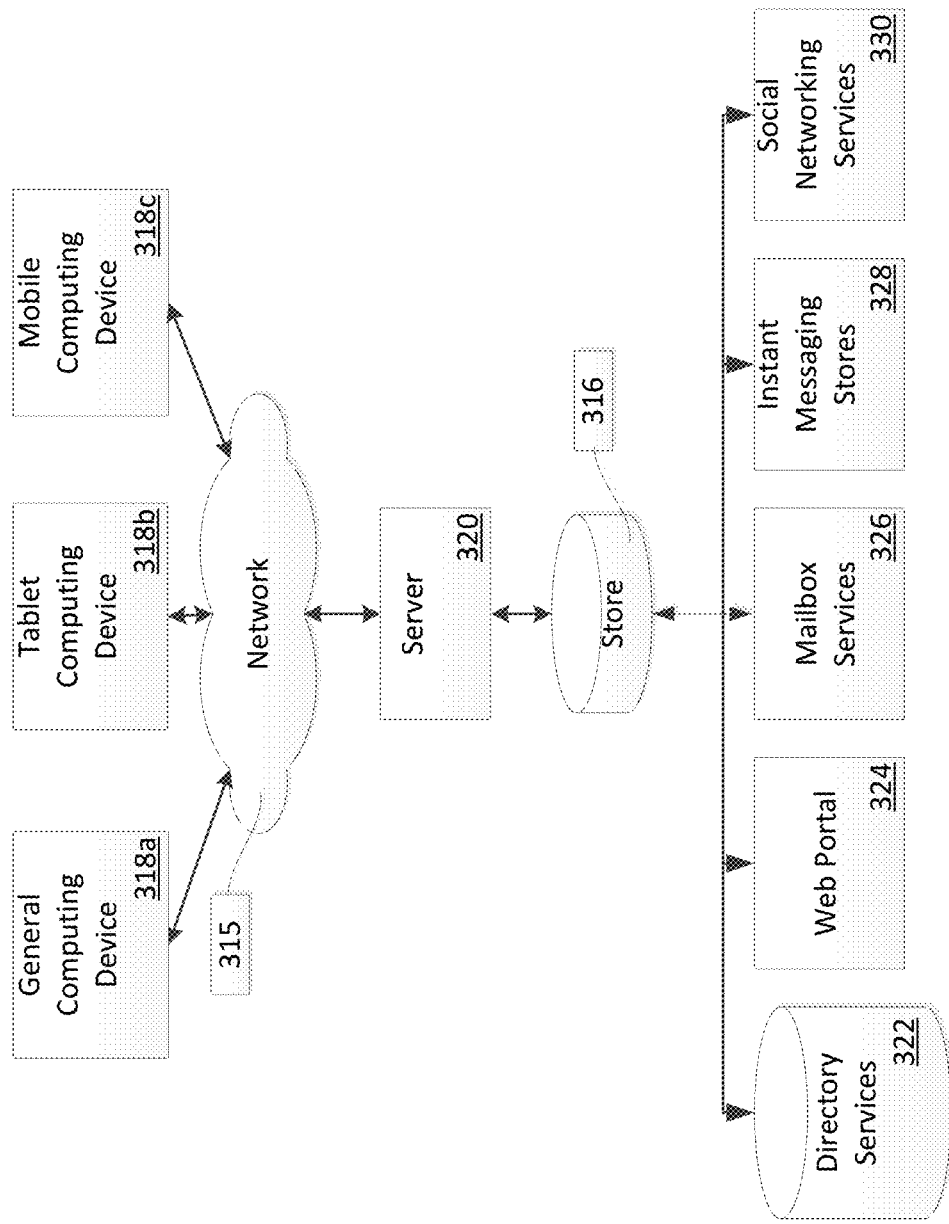
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a laptop computer, and the like, with which examples of the invention may be practiced. For example, mobile computing device 200 may be implemented to execute applications in association with application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

FIG. 4A is a diagram illustrating example orientations for a processing device with which aspects of the present disclosure may be practiced. FIG. 4A illustrates an example a processing device in a portrait mode orientation 406 and an example processing device in a landscape mode orientation 408. As illustrated in the visual examples of FIG. 4A, the application command control 402 is displayable on a display of a processing device in a form-factor appropriate manner, for example, the portrait mode orientation 406 and the landscape mode orientation 408.

As shown in blocks 406 and 408, a display may be shared by at least an application command control 402 and application/canvas 404. An application command control 402 is a graphical control element that interfaces with an application that executes on the processing device (e.g., memory, processor and functions of mobile device) and software components such as an operating system (OS), applications executing on a mobile device, programming modules, input methods (e.g., SIP) and command container such as a pane or contextual menu, among other examples. As an example, the application command control 402 is used to control execution of actions/commands for the application. An SIP is an on-screen input method for devices (e.g., text input or voice input), and a pane is a software component that assists function of other software running on the device such as the OS and other software applications, among other examples. An application 404 is a software component that executes on the processing device, interfacing with hardware and software components of the device. The application 404 comprises one or more programs designed to carry out operations. Block 404 shows an application/canvas, being a portion of a display of a processing device that is designated for display of an application executing on the device. The application/canvas region is the application UI (comprising of but not limited to graphical elements and controls) or the application canvas. The application canvas is the content (consisting of but not limited to the pages in workspace or editable portions of an application.

The application command control 402 provides command control for one or more applications executing on small screen devices or being displayed in a display window that is equal to or less than a threshold value. An OS on a device interfaces with the application command control 402 to enable input to be received in any form that is recognized by a processing device including touch input (e.g., directly on a display of the mobile device or indirectly through buttons or functions of the device), voice input and text input (e.g., via keyboard or virtual keyboard). The application command control 402 is programmed to handle execution of robust applications under screen/display constraints related to devices having a width of its display be less than or equal to a threshold value (e.g., predetermined threshold value). The application command control 402 supports execution in orientations as shown in blocks 406 and 408 and any other related orientations. Further, the application command control 402 supports execution of change between orientation states as shown in blocks 406 and 408. Functionality of the application command control 402 remains the same regardless of an orientation state of a mobile device executing the application command control 402. For instance, presentation of actions/commands of the application command control 402 remains the same when the device is operating in a portrait mode orientation 406 and a landscape mode orientation 408. In examples, application command control 402 can either remain open or enter a collapsed/minimized state on device orientation change (e.g., from portrait orientation to landscape orientation, and vice versa).

Figure 12:
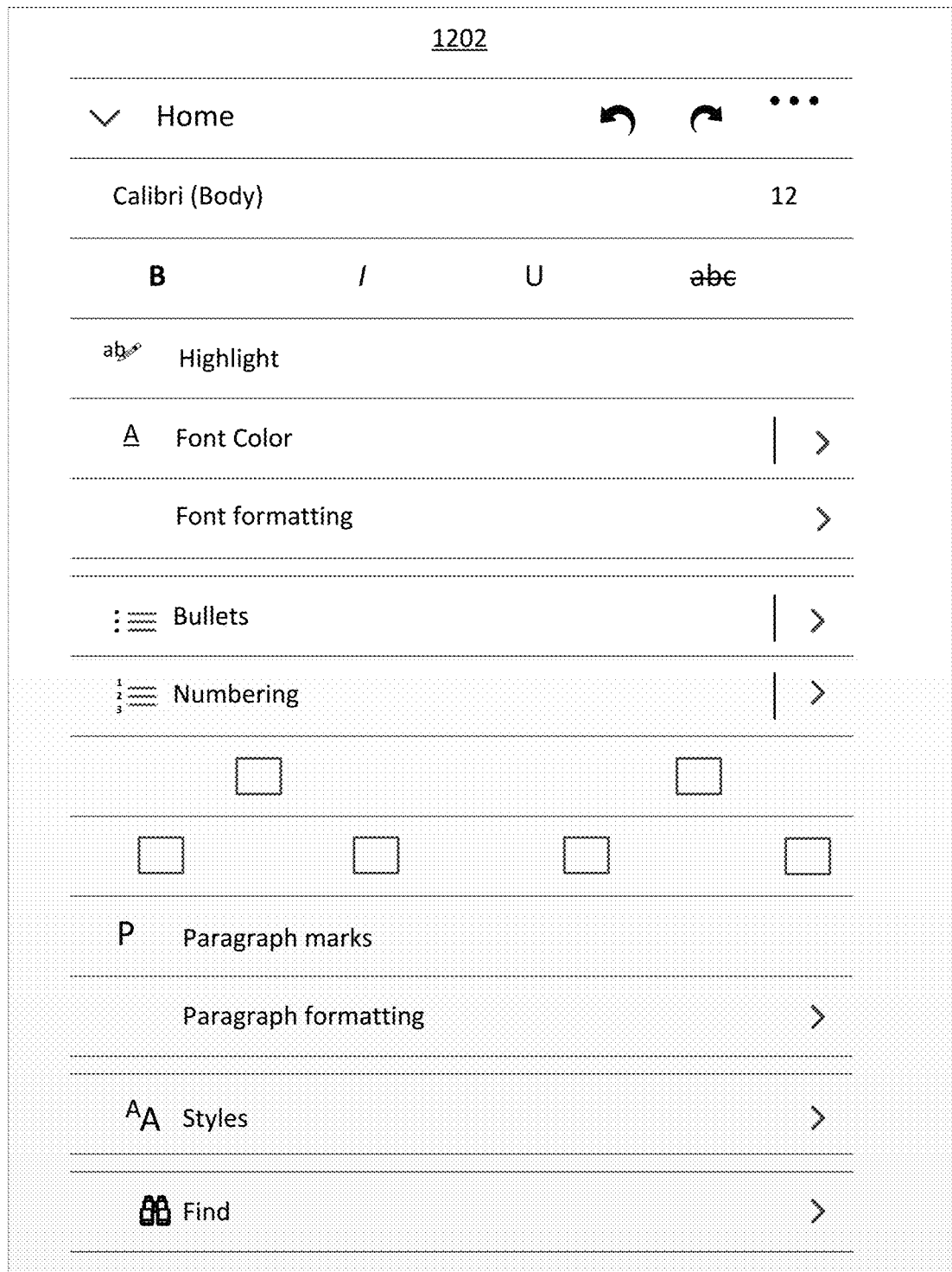
FIGS. 12-20 are diagrams illustrating examples of application command control with which aspects of the present disclosure may be practiced.
Figure 13:
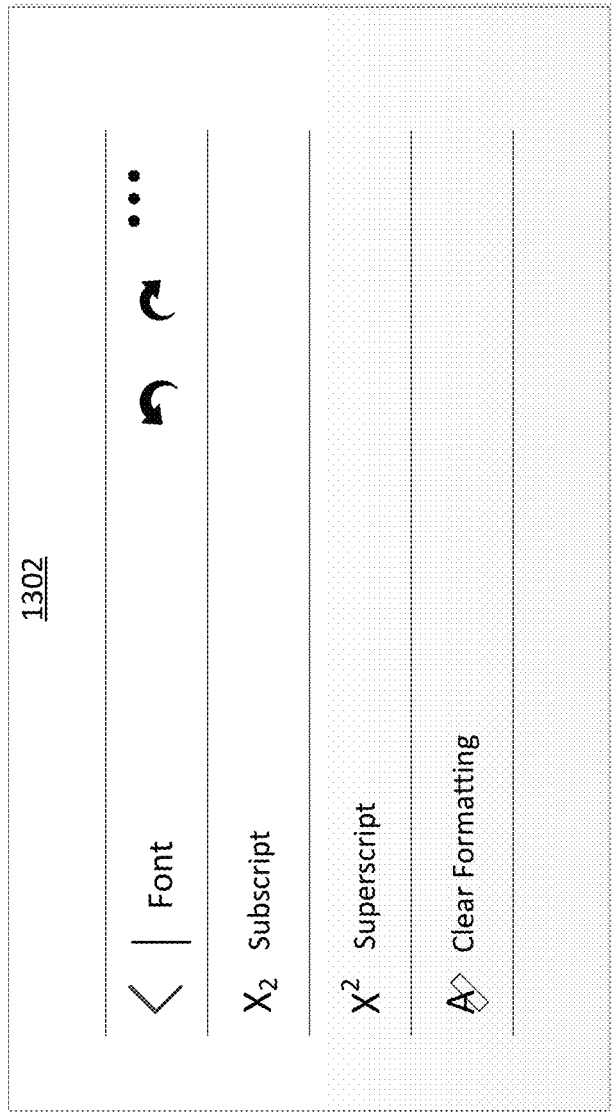
Figure 14:
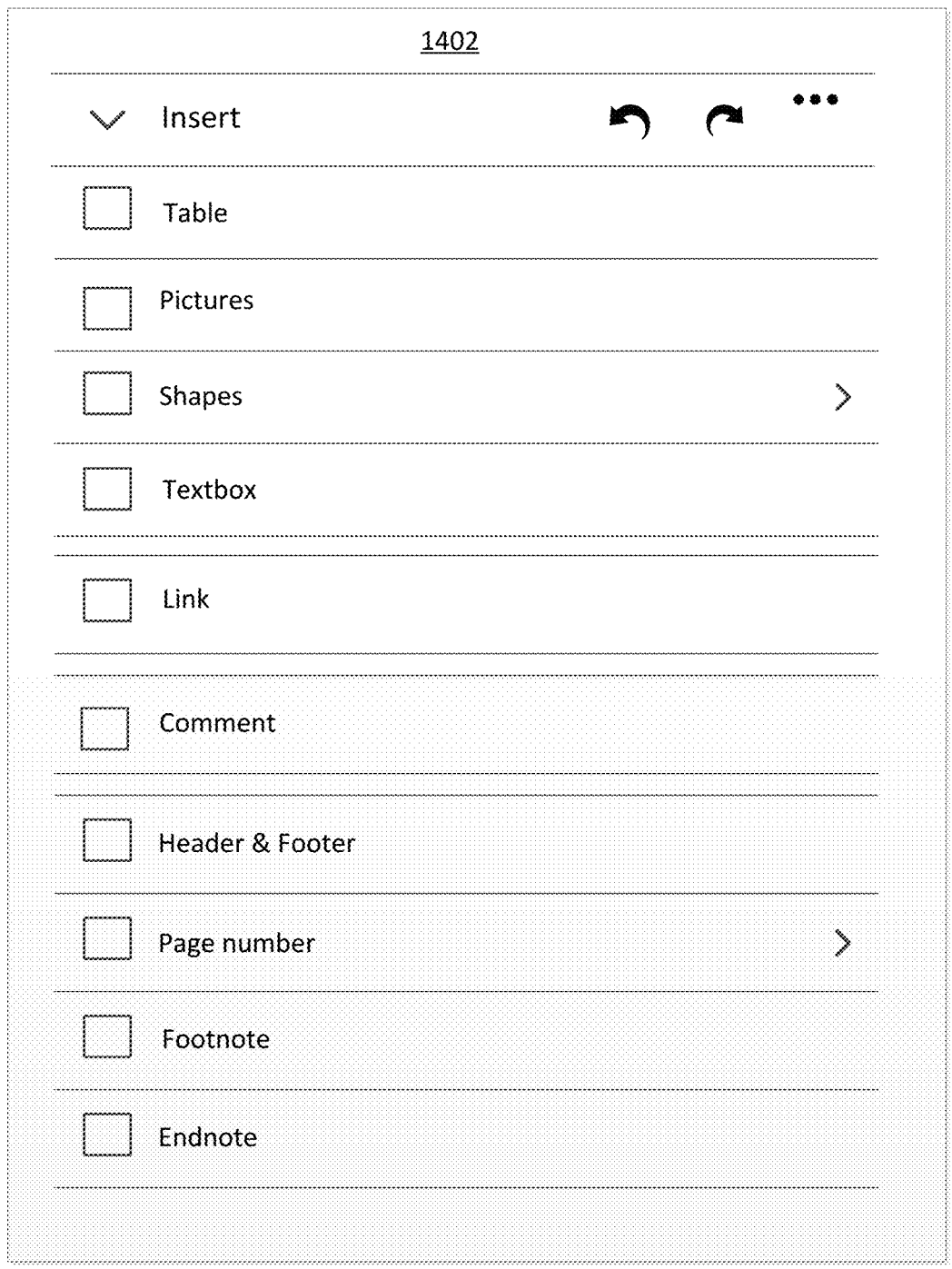

The application command control 402 comprises a plurality of palettes (command palettes) programmed for application control. A palette is a collection or associated grouping of actions or commands or chunks of commands that can be implemented by the application command control 402. In one example, palettes of the application command control 402 comprise top-level palettes and drill-in palettes. Each of the top-level palettes and the drill-in palettes is a collection or grouping of rows comprising one or more selectable commands or command elements. As an example, a top-level palette may comprise a highest level grouping of commands or functionalities and including commands that are more frequently used/more likely to be used by users. A top-level palette may display command listings that can be drilled into and displayed in drill-in palettes. FIG. 12 illustrates an exemplary top-level palette of the application command control 402. A drill-in palette is a collection or grouping of commands that may be used less frequently/or likely to be used less frequently compared to the commands displayed on a top-level palette. As an example, drill-in palettes host over-flow commands that, due to constraints resulting from a limited amount of display space for the application command control 402 on a display of a small screen device, are not included in a top-level palette. FIG. 13 (described below) illustrates an exemplary drill-in palette of the application command control 402. Using a word processing application as an exemplary application, a top-level palette may comprise high-level commands or functionality for text editing, font editing, paragraph formatting, word finder, spell-check etc. that may be frequently called on by users. As an example, a drill-in palette for a word processing application may comprise sub-elements of such high-level commands of the top-level palette, for example, subscript or superscript commands for a font command/function. In examples, organization of palettes and commands may be editable, for example, where a command or given chunk of a palette can be pulled from one palette and added/displayed in another. For instance, an overflow command of a drill-in palette can be added to a top-level palette.

Figure 4B:
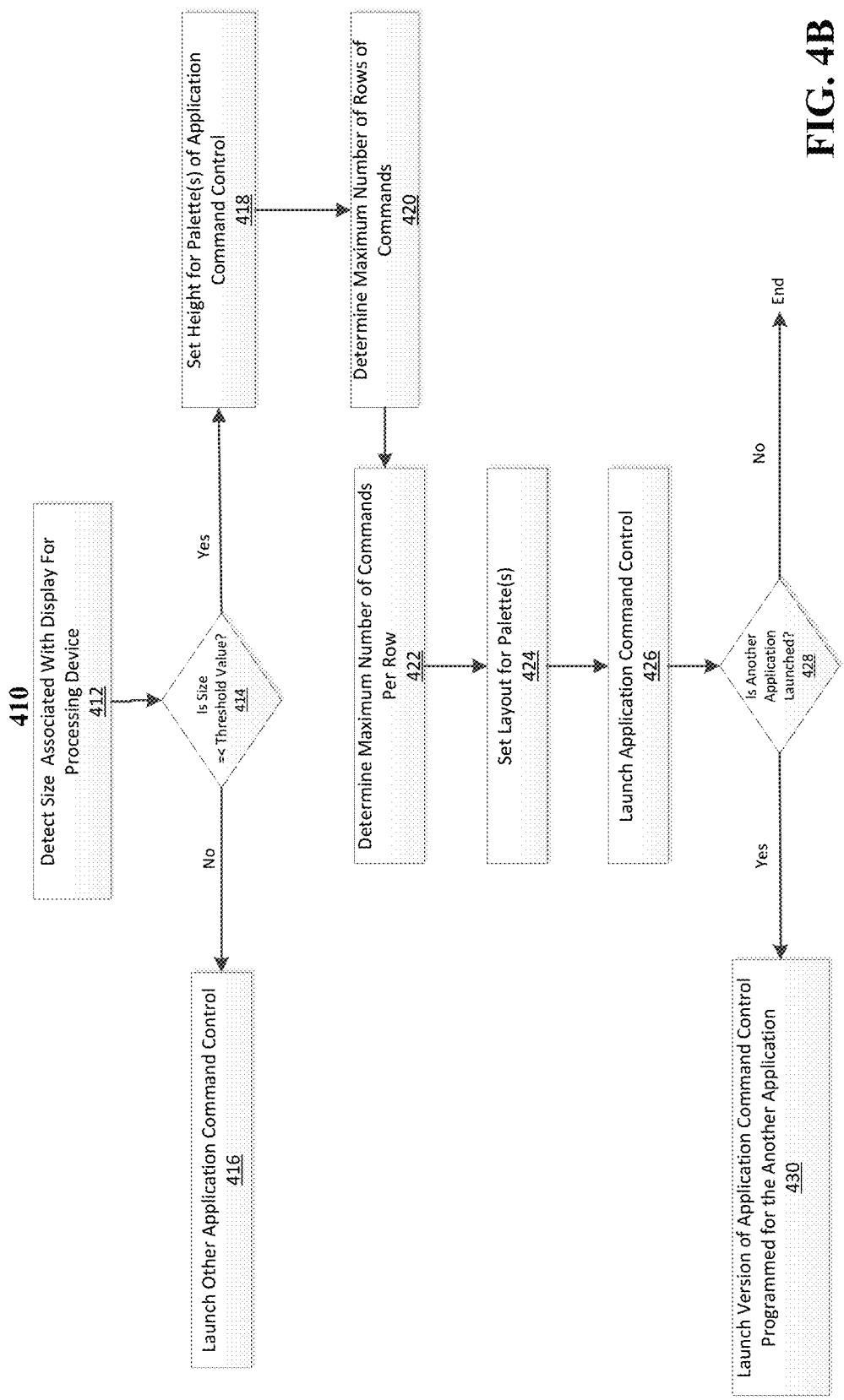
FIG. 4B is an exemplary method for launching an application command control with which aspects of the present disclosure may be practiced.

FIG. 4B is an exemplary method 410 for launching an application command control with which aspects of the present disclosure may be practiced. Method 410 may be executed on a device comprising at least one memory that is configured to store operations, programs, instructions, and at least one processor that is configured to execute the operations, programs or instructions.

Method 410 begins at operation 412 where a size associated with a display for a processing device is detected. Detecting of the size of the display for the processing device enables determining whether an application command control that is programmed for display on small screens should be launched or if another application command control should be launched (e.g., for larger screen display such as a desktop version of application/application command control). In one example detecting of the size comprises detecting a display width (e.g. width of the display for the processing device or operating size of a display window for an application executing on the processing device). Operation 412 may comprise a program instruction or module that can identify and evaluate system specifications for a processing device such as a mobile device. In one example, the programming instruction implemented in operation 412 identifies a type or version of the processing device and operations a fetch of data to identify whether the application command control is programmed to operate on the processing device. In another example, detection of the size associated with the display for the processing device (operation 412) occurs when downloading an application and/or application command control, where downloading of an application that interfaces with the application command control or downloading of the application command control may be allowed or denied based on a display size (e.g., display width). In another example, application and application command control 402 that interfaces with the application may be preloaded on a processing device.

Flow proceeds to decision 414 where it is determined whether the size associated with the display for the processing device is equal to or less than a threshold value. The threshold value corresponds to identification of small screen processing devices or an operating environment that is suitable for small screen application command control. The threshold value may be set at any predetermined value related to a size of a display of a processing device including but not limited to: total screen size, width, length, and screen diagonal, pixels, effective pixels and resolution, and operating size of a display window of an application, among other examples. As an example, the threshold value may correspond to the display width of a display for the processing device. For instance, the threshold value for a display width may be set to 512 effective pixels. A display width of 512 effective pixels could correspond to a device having a screen diagonal of less than 6 inches or 152.4 millimeters. However, one skilled in the art will recognize that the threshold value (e.g., for display width) can any criteria that is predetermined and can change for example, as sizes of processing devices change over time.

If decision 414 determines that the size associated with the display is not equal to or less than the threshold value, flow proceeds to operation 416 where another application command control is launched. For example, another version of an application/application command control that is intended for larger screen display may be launched.

If decision 414 determines that the size associated with the display is equal to or less than the threshold value, flow proceeds to operation 416 where a height is set for palette(s) of an application command control. A height for a palette displayed by an application command control, such as application command control 402 described in FIG. 4A, is an amount of space the application command control takes up length-wise on a display of a processing device when the application command control is in an open state displaying the palette. States of the application command control are described in FIG. 6. In one example, height of a palette of the application command control is set by a program developer of the application command control and is prevented from being resized by a user. In another example, height of a palette may be adjustable, for example during use by a user. In any example, height of a palette of the application command control may be set conditionally based on use of the application command control. For example, a height of a palette may be set for cases where the application command control is displayed in different states (e.g., open state, minimized state, invisible state, etc.). In different states, a height of one palette or all palettes displayed may be set to a predetermined value. For instance, a palette height may be set to a percentage (e.g., 55%) of a height of a display for the processing device when the application command control is operating in an open state. In another example, a height of a palette may be set to different percentage (e.g., smaller percentage) of a display when the application command control is operating in a minimized state. Height of a palette may also be conditional based on launching of other software components by the OS such as an application canvas 404, an SIP, and usage panes. For example, conditions may be set such as when the palette sites above an SIP or below a pane, its height is equal to the remaining vertical space on the display of the processing device. When a software component such as an SIP or usage pane is closed or minimized, this may adjust the height of a palette of the application command control, for example back to the originally set height for display of a palette.

Flow proceeds to operation 420 where a maximum number of rows of commands for a palette are determined and operation 422 where a maximum number of commands per row are determined for a palette. Operations 420 and 422 enable an application command control to best layout palettes and commands for users given the limited space available on processing devices. Scaling for display of commands in palettes of the application command control 402 is intelligently programmed based on the display size (e.g., display width or operating size of display window) of a processing device such as a mobile device. Operation 420 determines a maximum number of rows of commands for a palette based on the display size of the processing device. Operation 422 determines a maximum number of commands per row, which are determined for a palette based on the display size of the processing device.

As an example, scaling plateaus may be implemented based on screen size, device type or effective resolution of the mobile device, among other examples. For example, evaluation of the mobile device may determine that a diagonal of a display for a processing device is four inches wide, and the display of the processing device has a resolution that is 360 pixels in width by 640 pixels in length. Thus, the application command control 402 may use its scaling plateau determine that for a display having an effective pixel width of 360 pixels, a maximum of 8 rows should be displayed each having a maximum of 4 commands per row. This enables the application command control to determine how much screen space it has to work with, and what the best way to allocate such screen space is. In another example, evaluation of the processing device may determine that a diagonal of a display for a processing device is 5.5 inches wide, and the display of the processing device has a resolution that is 512 pixels in width by 853 pixels in length. Thus, the application command control 402, based on its scaling plateaus, may determine to display up to 12 rows and up to 6 commands per row of commands in palettes that are displayed.

Flow proceeds to operation 424 where a layout for a palette or palettes of the application command control is set. Setting a layout for the application command control comprises setting a layout for at least one the top-level palettes and/or drill-in palettes. Operation 424 identifies what commands to include in which palettes and how to layout the palettes, for example, according to the maximum number of rows and the maximum number of commands per row determined according to the display size for a processing device and the scaling plateaus. For example, operation 424 determines how commands should be grouped or nested (e.g., in top-level palette or drill-in palettes) based on the display size available for display of the application command control without preventing display of an application or other software component. In examples, commands can be grouped or nested based on size based on size (e.g., evaluation of command grouping data), telemetry data (e.g., user data or usage data) or a combination of the two.

Data related to usage of commands or functions for applications may be tracked to intelligently improve creation and organization of palettes of the application command control 402. For example, telemetry data (e.g., historical data related to application/application command control usage) may be tracked and evaluated for improved programming of the application command control 402. Examples of metrics that are tracked include but are not limited to: number of times each command is used, number of times each palette is visited, number of actions per palette before switching palettes, number of actions completed before dismissing a palette, among other examples. Telemetry hardware or software may be implemented to track data usage of the application command control 402 with applications on an individual or group level. Telemetry hardware or software may interface with processing devices running the application command control 402 to obtain such metric data.

Organization or grouping of commands in palettes may also be based on command grouping data available to programmers of an application command control. Command grouping data is information relating to the grouping of commands including associations between commands. For example, text editing features such as bolding, underlining, italicization, superscript and subscript may be associated and commonly used. Ideally, the application command control would like to include all of these commonly used functions on the same palette. However, due to limitations on the screen size, certain commands may need to be separated. Command grouping data is information that identifies associations and what commands should or should not be separated from each other. For example, the application command control 402 may determine that the maximum number of rows and commands allows displaying of text formatting commands including a superscript editing command in a top-level palette but would not also allow displaying of a subscript command. Using the command grouping data, it may be identified that from a functionality and/or usability standpoint, it is best not to separate the superscript and subscript editing commands. For instance, a user who makes a subscript text edit may later look to make a superscript edit or visa-versa. Thus, in setting the layout of commands for palettes, the application command control 402 may display a higher-level command for text editing in a top-level palette and the superscript and subscript editing commands may be included in a drill-in palette (child palette) of that top-level palette (parent palette) so they are not separated from each other.

Examples of common components that make up a top-level palette include but are not limited to: a palette bar and palette title, palette switching feature (including one touch target that launches palette switcher from title of palette bar), command to dismiss palette (e.g., visual representation of ellipses), quick commands (e.g., undo or redo), palette canvas comprising a plurality of commands, chunk commands (e.g., groupings of commands) and chunk dividers (e.g., dividing different groupings of commands), drill-in features to access drill-in palettes (when applicable).

Examples of common components that make up a drill-in palette can include but are not limited to: a palette bar and palette title, command to navigate back to the parent palette, command to dismiss palette (e.g., visual representation of ellipses), quick commands (e.g., undo or redo), palette canvas comprising a plurality of commands, chunk commands (e.g., groupings of commands) and chunk dividers (e.g., dividing different groupings of commands).

In one example, palettes of the application command control are presented in a vertical layout. For example, a top-level palette and a drill-in palette are vertically scrollable and comprise a collection of rows comprising one or more selectable command elements. However, in other examples, setting of the layout of a palette (operation 424) may also comprise presenting commands in a horizontal layout where commands are horizontally scrollable. In some examples, no limit is set on the scrollable height of a palette. Scrolling position may be kept on top-level palettes when switching between top-level palettes however scrolling position may or may not be kept for drill-in palettes. Commands set and displayed may include labels identifying a command and may be configured to take up an entire row of a palette. In other examples, multiple commands may be displayed in one row of a palette. Scaling is applied to setting and displaying commands in palette rows. In some other examples, commands may not have labels, for example, commands that are well known or have images displayed that are well known to users. Separators or spacers (either horizontal or vertical depending on layout of palette) may be displayed to break up different commands or chunks of commands.

Flow proceeds to operation 426 where an application command control is launched for an application executing on the processing device. Launching of an application command control may occur simultaneously or as close to the launching of an application that interfaces with an application command control. An application command control can interface with and be launched for any application including but not limited to: word processing applications, spreadsheet applications, presentation applications, database management applications, note-taking applications, data management applications (e.g., project management applications), diagramming applications, editing applications, communication applications, publishing applications, server applications, client applications, and web service applications, among other examples. The application command control launched in operation 426 is an application command control that is that is programmed for devices having a display size that is less than or equal to the threshold value. If a processing device has a display size that is larger than the threshold value, then as described in operation 416, other applications/application command controls may be applicable. For example, the application command control is launched if a display width associated with the processing device is detected to be equal to or less than the threshold value. In one example, in cases where a device is preloaded with an application and the application command control, requirements for launching of the application command control for mobile devices may be implicitly satisfied.

In one example, launching of the application command control comprises launching the application command control in a minimized state hiding palettes of the application command control. In another example launching comprises displaying a top-level palette, and after receiving a selection of a drill-in feature from the top level palette, presenting a drill-in palette along with the top-level palette. In that example, the drill-in palette emerges horizontally from the top-level palette upon selection of the drill-in feature.

When launched, an exemplary application command control is displayed at a bottom portion of a display of the processing device. In another, the application command control comprises at least two parts, a first part displaying at a top portion of a display of the processing device and a second part displaying at a bottom portion of the display of the processing device. Portions of the application command control may be set or variable. In one example, a top portion of the application command control may include functions or commands that are not palette specific including but not limited to: invocation and dismissing functions, minimizing/maximizing functions, naming conventions, palette switching functions, links to other applications, etc. In another example, all command functions may display in a bottom portion of the application command control displaying on a bottom portion of a display.

Multiple versions of an application command control can be executed at the same time. Different versions of the application command control may be specifically programmed for different types of applications. Flow of method 410 may further detect whether another application is launched (operation 428). If not, then flow of method 410 ends. If so, then flow proceeds to operation 430, where another version of the application command control that is programmed for a different application is launched.

Furthermore, the present disclosure enables transition of the application command control 402 when a display (e.g., window) of an application is resized to a display size that is less than or equal to the threshold value. That is, launching of an application command control for small screen devices may be associated with detection of an operating size of a window displayed on a processing device. For example, when an application that is originally running in a window that is greater than the threshold value (i.e. on a larger processing device) is reduced to run in a window that is less than or equal to the threshold value, the processing device may launch a small screen application command control, effectively transitioning from a larger application command control to a smaller application command control programmed for small screen display. One skilled in the art will recognize that a threshold value related to/from a small screen application command control is able to be determined by an application/application command control developer.

Figure 5:
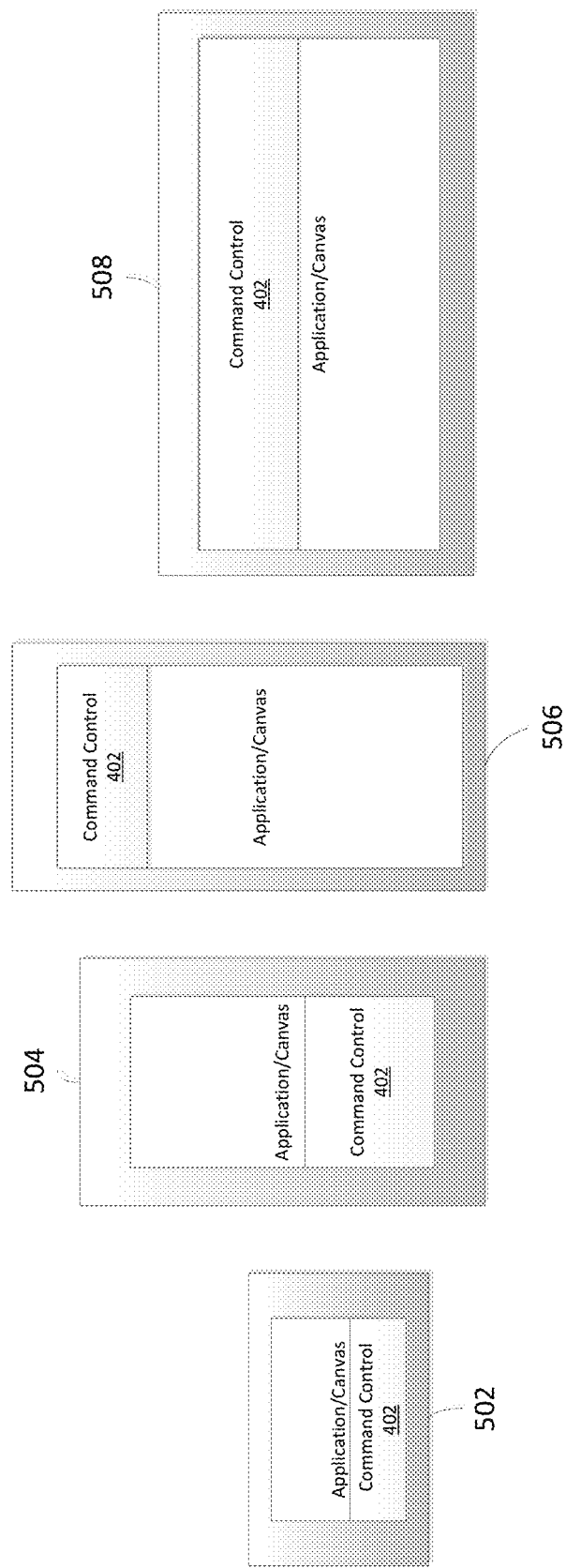
FIG. 5 is a diagram illustrating display for processing devices of different sizes with which aspects of the present disclosure may be practiced.

FIG. 5 is a diagram illustrating a display for processing devices of different sizes with which aspects of the present disclosure may be practiced. Examples shown in FIG. 5 comprise processing devices having varying sizes and/or varying screen/display sizes, for example processing device 502, processing device 504, processing device 506 and processing device 508. As shown in FIG. 5, the application command control 402 and the application/canvas 404 are displayed in example processing devices 502-508. As described in FIG. 4B, the application command control 402 is programmed to efficiently scale itself to utilize display space of processing devices of different sizes and/or operating size of display windows. For example, presentation of the application command control 402 across the different processing devices 502-508 may vary.

Figure 6:
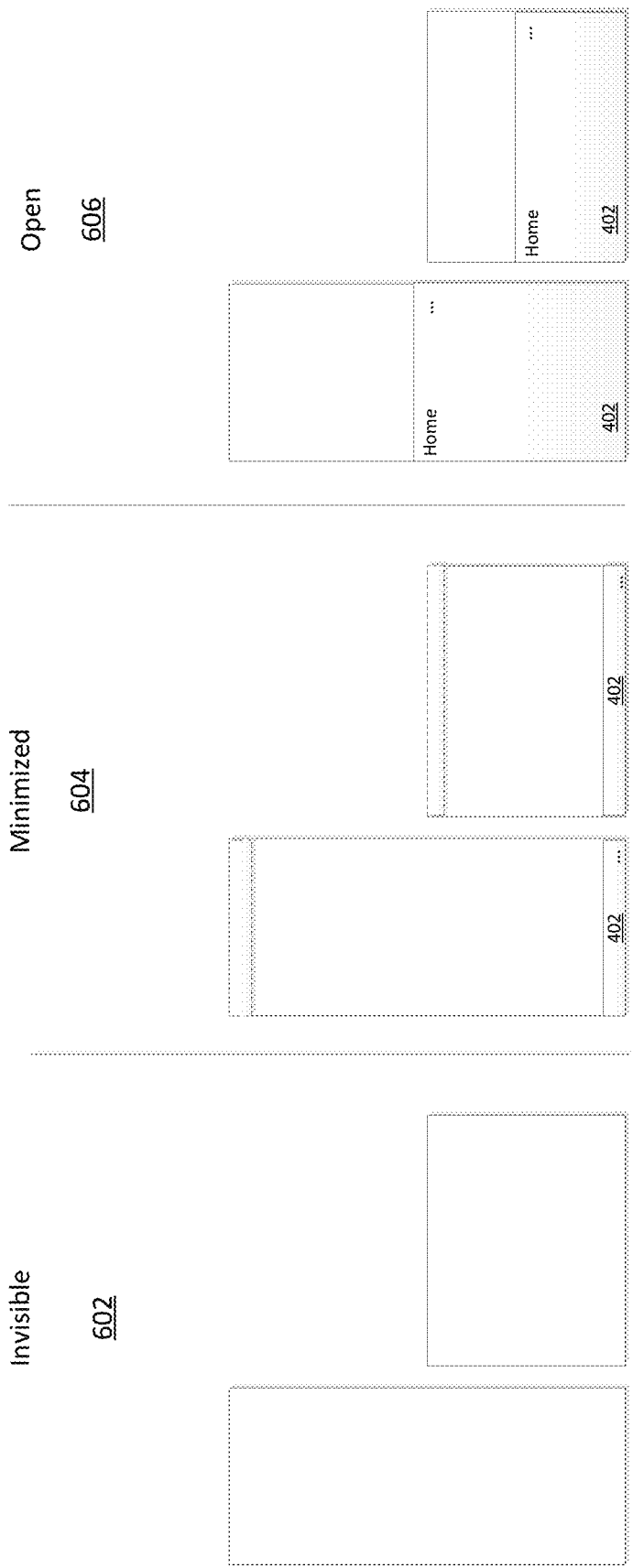
FIG. 6 is a diagram illustrating different example states of execution for an application command control with which aspects of the present disclosure may be practiced.

FIG. 6 is a diagram illustrating different example states of execution for an application command control with which aspects of the present disclosure may be practiced. An exemplary application command control is application command control 402 described in FIG. 4A. As shown in FIG. 6, states of execution for an application command control comprise an invisible state 602, a minimized state 604 and an open state 606. However, one skilled in the art will recognize that states shown in FIG. 6 are not the only executions states for an application command control.

An invisible state 602 is a state of execution for the application command control 402 where the application command control 402 is not visible to the user (e.g., invisible or transparent). In the invisible state 602, the application command control 402 running on the OS but does not appear visible to the user. As examples, the invisible state is executed when an application is in a presentation mode, when a user returns to a home screen of an OS or when a user is actively scrolling through an application. However, the application command control 402 is programmable to enter into an invisible state 602 based on any actions related to use or non-use of a processing device. In one example, the application command control 402 enters the invisible state 602 during idle periods. An idle period may be set by a programmer or application developer of the application command control 402.

A minimized state 604 is a state of execution for the application command control 402 where the application command control 402 is displayed but does not shown any palettes. As an example, the minimized state 604 is a default state of the application command control 402. For example, the minimized state 604 is the execution state that the application command control 402 may first be launched. The application command control 402 is programmable to enter into a minimized state 604 based on any actions related to use or non-use of a processing device. In one example, the application command control 402 returns to the minimized state 604 during idle periods.

An open state 606 is a state of execution for the application command control 402 where the application command control 402 is in use. In the open state 606, the application command control 402 displays one or more palettes (e.g., the top-level palettes and the drill-in palettes) and enables execution of commands. The application command control 402 is programmable to enter into an open state 606 based on any actions taken by a user of a processing device or by the application entering a pre-defined state.

Figure 7:
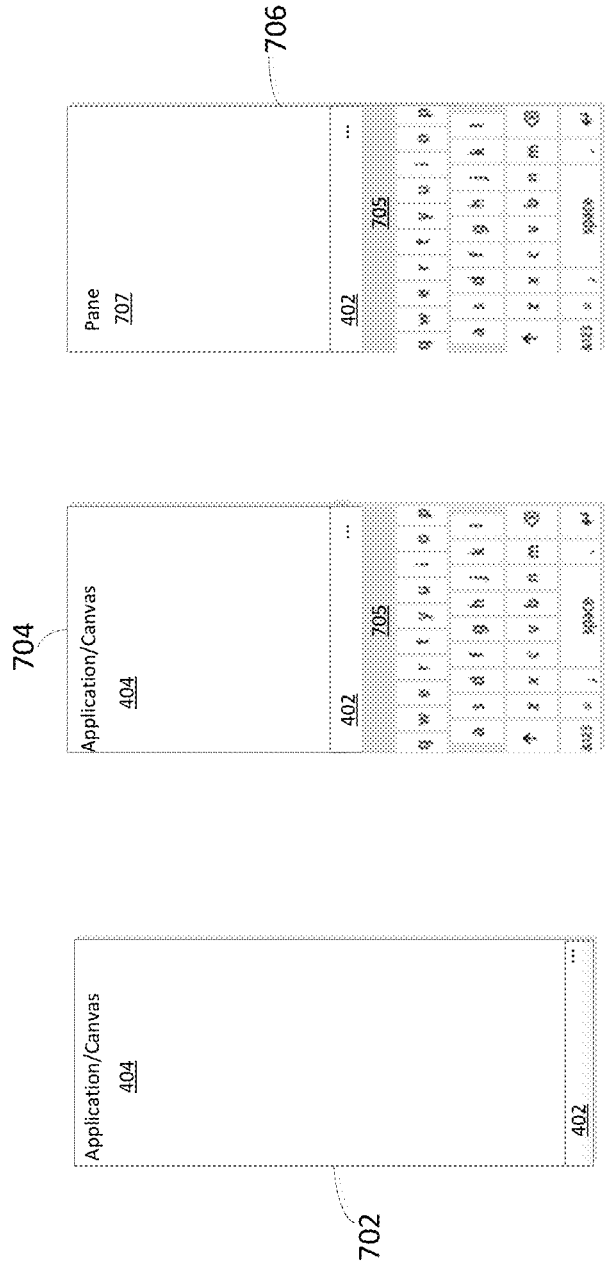
FIG. 7 is a diagram illustrating examples of positions of an application command control in a minimized positioning with which aspects of the present disclosure may be practiced.

FIG. 7 is a diagram illustrating examples of positions of an application command control in a minimized positioning with which aspects of the present disclosure may be practiced. Minimized positioning of the application command control 402 may occur when the application command control 402 is operating in a minimized state 604 as described with respect to FIG. 6. Display of the application command control 402 upon initial launch is shown in processing device view 702. As shown in processing device view 702, the application command control 402 is docked at the bottom of the display of the mobile device, below an application/canvas 404. Processing device view 704 shows that position of the application command control 402 changes on the screen when an SIP 705 (e.g., soft input keyboard) is presented on a display of a mobile device. As shown in processing device view 704, positioning of the application command control 402 in a minimized state is changed when the SIP 705 is displayed, where the application command control 402 is displayed above the SIP 705. Processing device view 706 shows display of the application command control 402 (in a minimized state), the SIP 705 and a pane 707, sharing the display of a mobile device. As shown in processing device view 706, the application command control 402 is displayed below a pane 707. The pane 707 is a software component that assists function of other software running on the mobile device such as the OS and other software applications, among other examples. One or more of the pane 707 can be displayed on a display of a processing device that may interface with the application command control 402. Exemplary panes 707 include but are not limited to: a navigation pane, a research pane, an editing pane, a control pane, a command pane, and a help pane, among other examples. In an example where both a pane 707 and an SIP 705 are displayed, the application command control 402 is displayed above the SIP 706 and below the pane 707. Although example positions of the application command control 402 are illustrated and described with respect to FIG. 7, one skilled in the art will recognize that positioning of the application command control 402 on a display of a mobile device is able to be variably controlled by a program developer.

Figure 8:
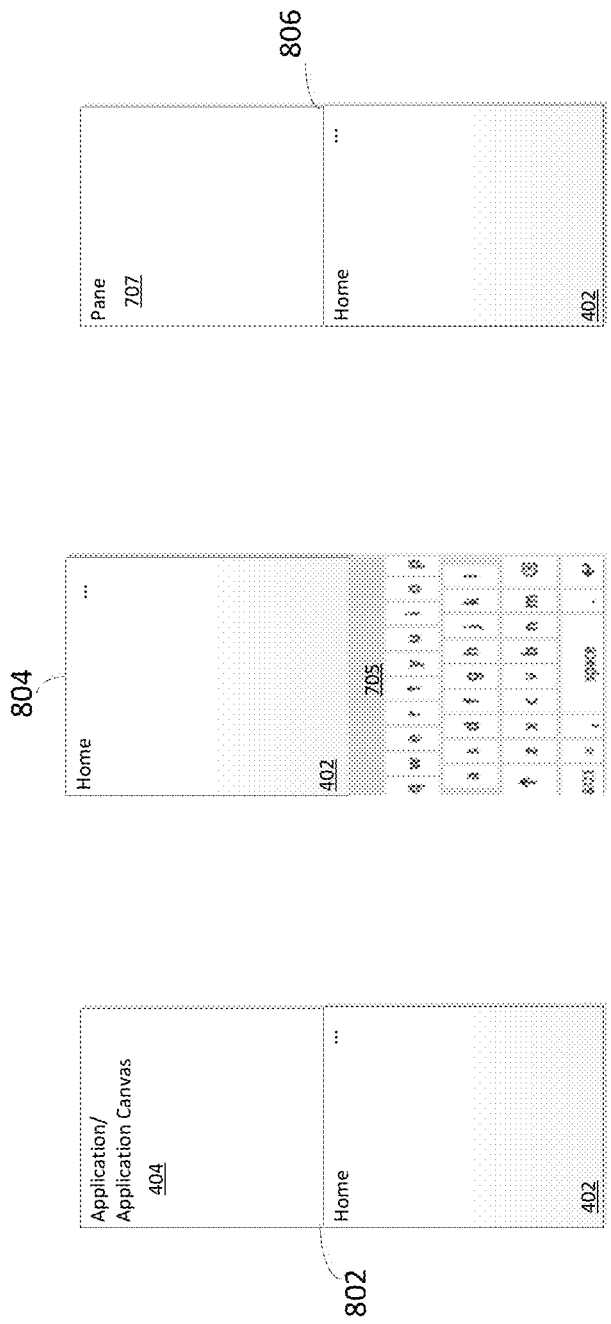
FIG. 8 is a diagram illustrating examples of positions of an application command control in an open position with which aspects of the present disclosure may be practiced.

FIG. 8 is a diagram illustrating examples of positions of an application command control in an open position with which aspects of the present disclosure may be practiced. Open positioning of the application command control 402 may occur when the application command control 402 is operating in an open state 606 as described with respect to FIG. 6. Display of the application command control 402 upon initial launch into an open state (e.g., based on launch of the application command control 402 or action taken by a user) is shown in processing device view 802. As shown in processing device view 802, the application command control 402 is docked at the bottom of the display of the processing device, below an application/application canvas 404. As an example, when the application command control 402 is in an open state and only the application 404 and the application command control 402 are displayed, a height of the application command control 402 may be set to be approximately half the display screen of a mobile device. However, as previously described, height of the application command control 402 may be variable. Processing device view 804 shows that position of the application command control 402 changes on the screen when an SIP 705 (e.g., soft input keyboard) is presented on a display of a processing device. As shown in processing device view 804, positioning of the application command control 402 in an open state is changed when the SIP 705 is displayed, where the application command control 402 is displayed above the SIP 705. In processing device view 804, the application command control 402 maintains a half-screen display but positioning of the application command control 402 is above the SIP 705. Processing device view 806 shows display of the application command control 402 (in an open state), the SIP 705 and a pane 707, sharing the display of a mobile device. As shown in processing device view 806, the application command control 402 is displayed below a pane 707. In an example where both a pane 707 and an SIP 705 are displayed, the application command control 402 is displayed above the SIP 706 and below the pane 707. Although example positions of the application command control 402 are illustrated and described with respect to FIG. 8, one skilled in the art will recognize that positioning of the application command control 402 on a display of a mobile device is able to be variably controlled by a program developer.

Figure 9:
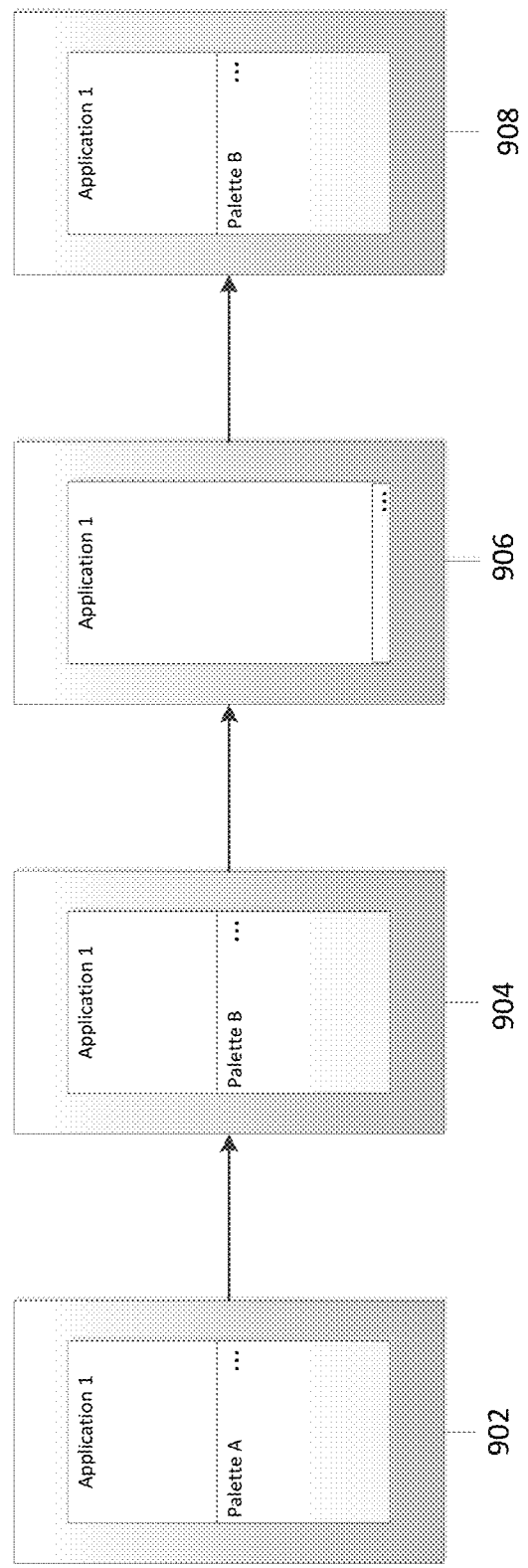
FIG. 9 is a block diagram illustrating example behavior of an application command control upon resuming or expanding with which aspects of the present disclosure may be practiced.

FIG. 9 is a block diagram illustrating example behavior of an application command control upon resuming or expanding with which aspects of the present disclosure may be practiced. FIG. 9 illustrates an example where an application command control is being executed in an active session of an application. An example active session is where an application command control was launched while an application is active and the application and/or application command control has not been closed. In examples, an application command control, such as application command control 402, may launch and/or close when an application launches or closes. In other examples, the application command control may be able to be launched or closed independent of the application. While the application command control is engaged with the application during an active session, a palette that was expanded in an open state before being minimized will still be expanded when the user returns to an open state of the application. In an example where a palette gets minimized, when the palette is re-opened, a user can see the same palette as before (e.g., it won't reset to a "home" palette). Exemplary palettes include either a top-level palette or a drill-in palette, examples of which have been previously described.

As shown in FIG. 9, processing device view 902 shows an open state of an application command control that is displaying "palette A". Processing device view 904 shows that while the application command control is in an open state, a palette of the application command control is changed to "palette B" from "palette A" (shown in processing device view 902). Processing device view 906 illustrates that an execution state of the application command control is changed from an open state to a minimized state. When the application command control is changed back to an open state from the minimized state, the same palette, "palette B", as was shown before the executed state change, is displayed in the open state of the application command control as shown in processing device view 908.

Figure 10:
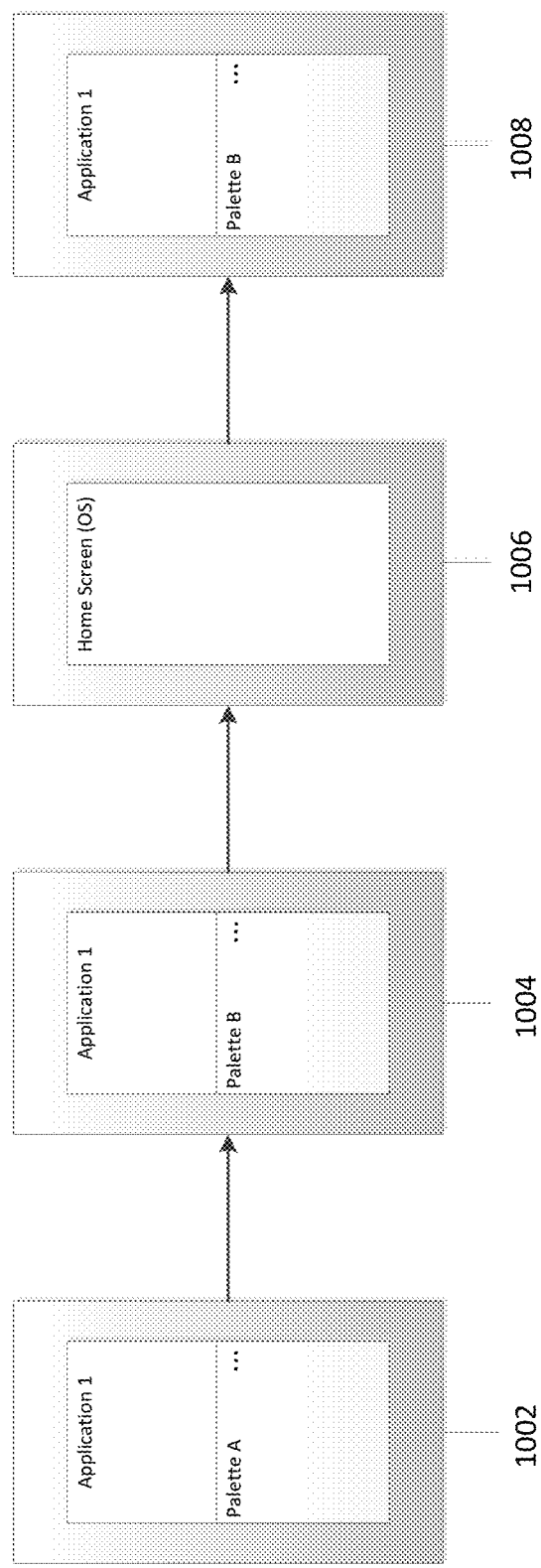
FIG. 10 is a block diagram illustrating example behavior of an application command control upon exiting an application and re-entering or re-launching the application with which aspects of the present disclosure may be practiced.

FIG. 10 is a block diagram illustrating behavior of an application command control upon exiting an application and re-entering or re-launching the application with which aspects of the present disclosure may be practiced. FIG. 10 illustrates examples where an active session of an application (e.g., "application 1") including a launched application command control is dismissed but remains active.

As shown in FIG. 10, processing device view 1002 shows an open state of an application ("application 1") and an application command control that is displaying "palette A". Processing device view 1004 shows that while the application command control is in an open state, a palette of the application command control is changed to "palette B" from "palette A" (shown in processing device view 1002). Processing device view 1006 illustrates that display of "application 1" and the application command control is dismissed and a home screen of an OS is displayed. When a user returns to "application 1" and the associated application command control, the same palette, "palette B", as was shown before dismissing display of "application 1," is displayed in the open state of the application command control as shown in processing device view 1008.

In one example, when a last used palette is a drill-in palette and the application command control is placed in a minimized state or the application is exited, the application command control displays the drill-in palette that was last displayed upon entry into an open state. In another example, when a last used palette is a drill-in palette and the application command control is placed in a minimized state or the application is exited, the application command control displays the top-level palette of the drill-in palette upon entry into an open state.

In an alternative example, when an application such as "application 1" is dismissed and closed, a palette that is first displayed in an open state of a launched application command control is a home palette (e.g., a first top-level palette). In another alternative example, when an application such as "application 1" is dismissed and closed, a palette that is first displayed in an open state of a launched application command control is a last used palette (e.g., top-level palette or drill-in palette).

The application command control comprises a selectable feature or command for invoking or dismissing a palette. As an example, the selectable feature for invoking/dismissing a palette is represented by ellipsis or ellipses marks as can be seen in FIGS. 4A and 6-21. However, one skilled in the art will recognize that other images/icons/commands can represent the selectable feature. As examples, a palette can be invoked programmatically by gestures including but not limited to: tapping the ellipsis icon, dragging the ellipsis icon, flicking the ellipsis icon, and voice commands, among other examples. For example, when the ellipsis icon is tapped, a command palette (e.g., top-level palette) is presented on the display. When the ellipsis icon is dragged, a commanding palette can be controllably presented by a user, and when the ellipsis icon is flicked, the command palette rapidly appears/disappears. The application command control further comprises animations and/or sounds for invoking/dismissing as well as other actions such as switching palettes, orientation changes, invoking commands and invoking software components such as an SIP or pane. In some examples, the user may exert control over such features.

Figure 11:
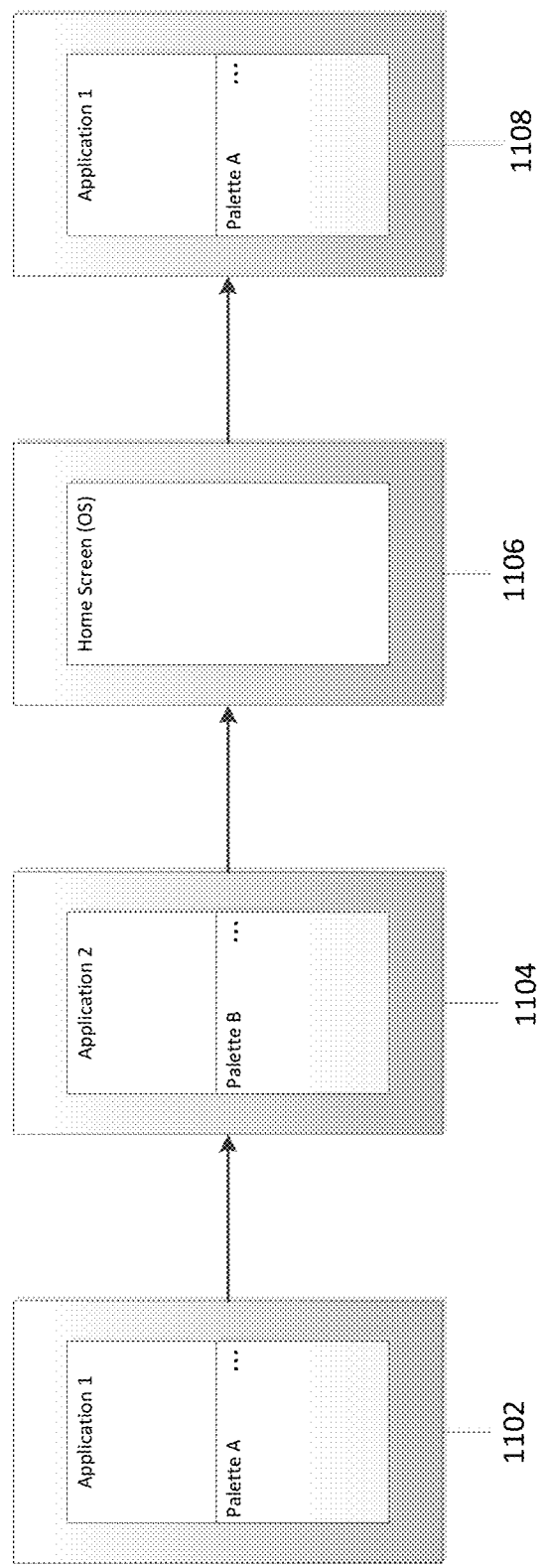
FIG. 11 is a block diagram illustrating example behavior of an application command control when multiple applications (or multiple instances of an application) are being utilized with which aspects of the present disclosure may be practiced.

FIG. 11 is a block diagram illustrating behavior of an application command control when multiple applications and multiple instances of an application are being utilized with which aspects of the present disclosure may be practiced. As shown in FIG. 11, processing device view 1102 shows an open state of an application ("application 1") and an application command control that is displaying "palette A". Processing device view 1104 shows launch of another application "application 2" that is displaying "palette B" in an open state of the application command control. In examples, launch of "application 2," may be a result of dismissing display of "application 1", dismissing and closing "application 1", or launching "application 2" simultaneously with "application 1" on a display of a processing device. Processing device view 1106 illustrates that display of at least one of "application 1" and "application 2" is dismissed and a home screen of an OS is displayed. When a user returns to "application 1" and the associated application command control, the same palette, "palette A", as was shown before dismissing display of "application 1," is displayed in the open state of the application command control as shown in processing device view 1108.

In one example, when an application such as "application 1" is dismissed and closed, a palette that is first displayed in an open state of a launched application command control is a last used palette (e.g., top-level palette or drill-in palette). In an alternative example, when an application such as "application 1" is dismissed and closed, a palette that is first displayed in an open state of a launched application command control is a home palette (e.g., a first top-level palette). In one example, that palette may be "palette A" however it could also be a home palette (e.g., if the home palette is not "palette A"). The same idea is applicable to a similar scenario invoking/dismissing/closing other applications such as "application 2."

As a note, different actions can cause transitions between states shown in at least FIGS. 6-11, including but not limited to tapping the ellipsis, tapping a Back button, tapping on the application canvas, tapping on an editable surface in the palette, and tapping on a specific command in the palette that invokes a pane, among other examples.

FIGS. 12-20 are diagrams illustrating examples of application command control with which aspects of the present disclosure may be practiced. In FIG. 12, application command control 1202 is an exemplary top-level palette. In FIG. 13, application command control 1302 is an exemplary drill-in palette. For example, application command control 1302 displays a drill-in palette of the top-level palette 1202 shown in FIG. 12, where top-level palette 1202 is a parent palette of the drill-in palette 1302 (e.g., child palette of the top-level palette). As shown in application command control 1202, a row showing a "font formatting" command includes a caret indicative of a drill-in feature. When the drill-in feature is selected, a drill-in palette of application command control 1302 is displayed on a display of a processing device. As can be seen in application command control 1302, font formatting command features "superscript" and "subscript" are displayed.

Figure 15:
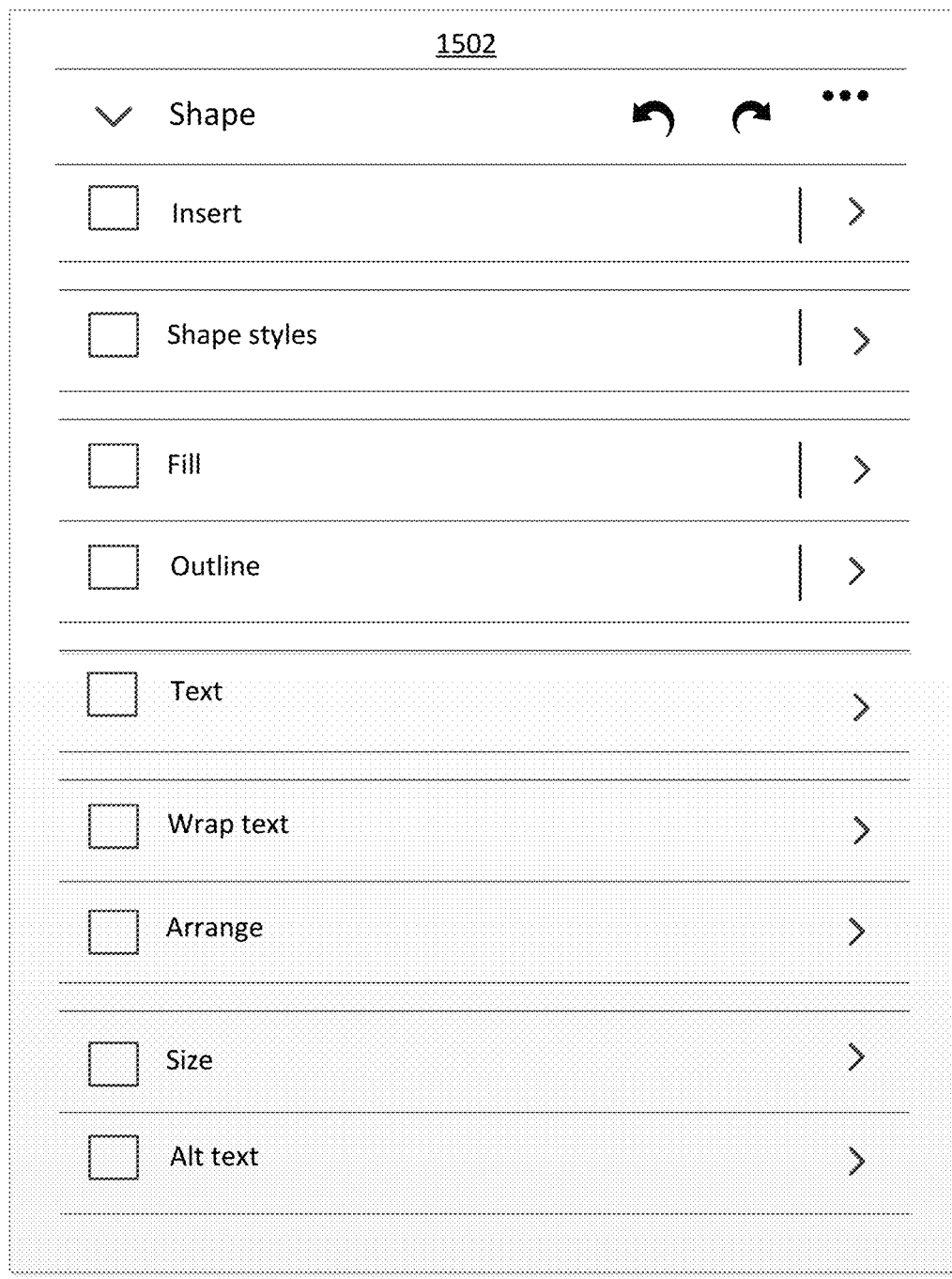
Figure 16:
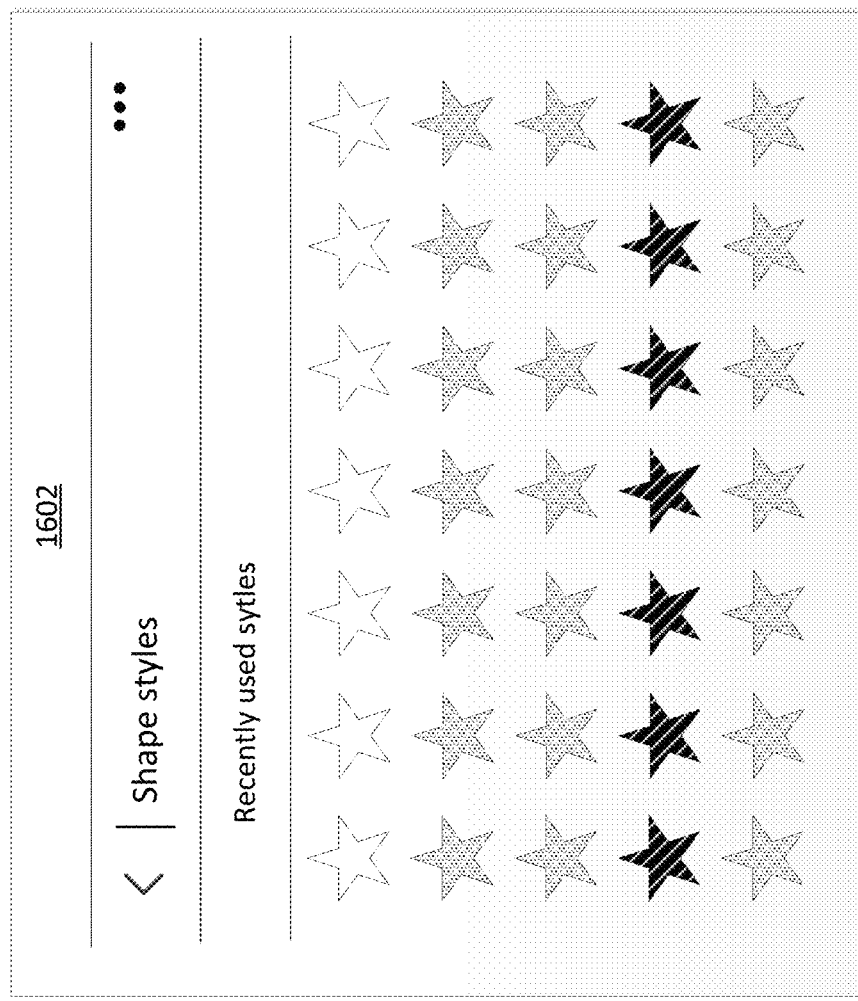

In FIG. 15, application command control 1502 is an exemplary top-level palette. In FIG. 16, application command control 1602 is an exemplary drill-in palette. For example, application command control 1602 displays a drill-in palette of the top-level palette 1502 shown in FIG. 15, where top-level palette 1502 is a parent palette of the drill-in palette 1602 (e.g., child palette of the top-level palette). As shown in application command control 1502, a row showing a "shape styles" command includes a caret indicative of a drill-in feature. When the drill-in feature is selected, a drill-in palette of application command control 1602 is displayed on a display of a processing device. As can be seen in application command control 1602, shape style image features can be selected and used in coordination with an application.

Figure 17:
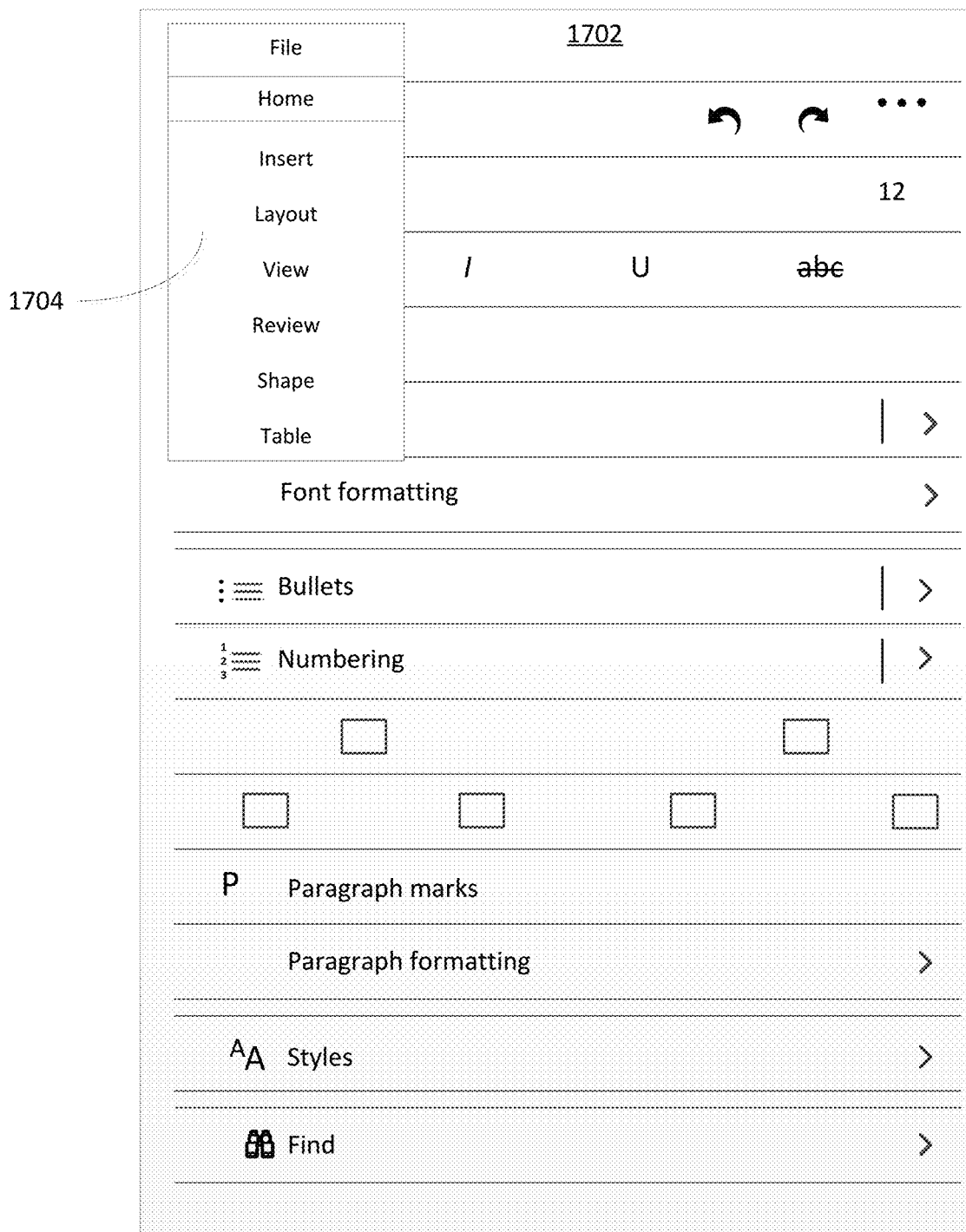

FIG. 17 illustrates an exemplary application command control 1702. Application command control 1702 is an exemplary top-level palette. A palette (e.g., a top-level palette or a drill-in palette) may comprise a palette switching feature 1704. A user may invoke a palette switching feature 1704 to change between palettes or change features/views of a palette. The palette switching feature 1704 may identify different palettes that a user can switch between as shown in the palette switching feature 1704. However, one skilled in the art will recognize that palettes of an application command control can comprise additional palettes or palettes types than are listed in display of the palette switching feature 1704.

Figure 18:
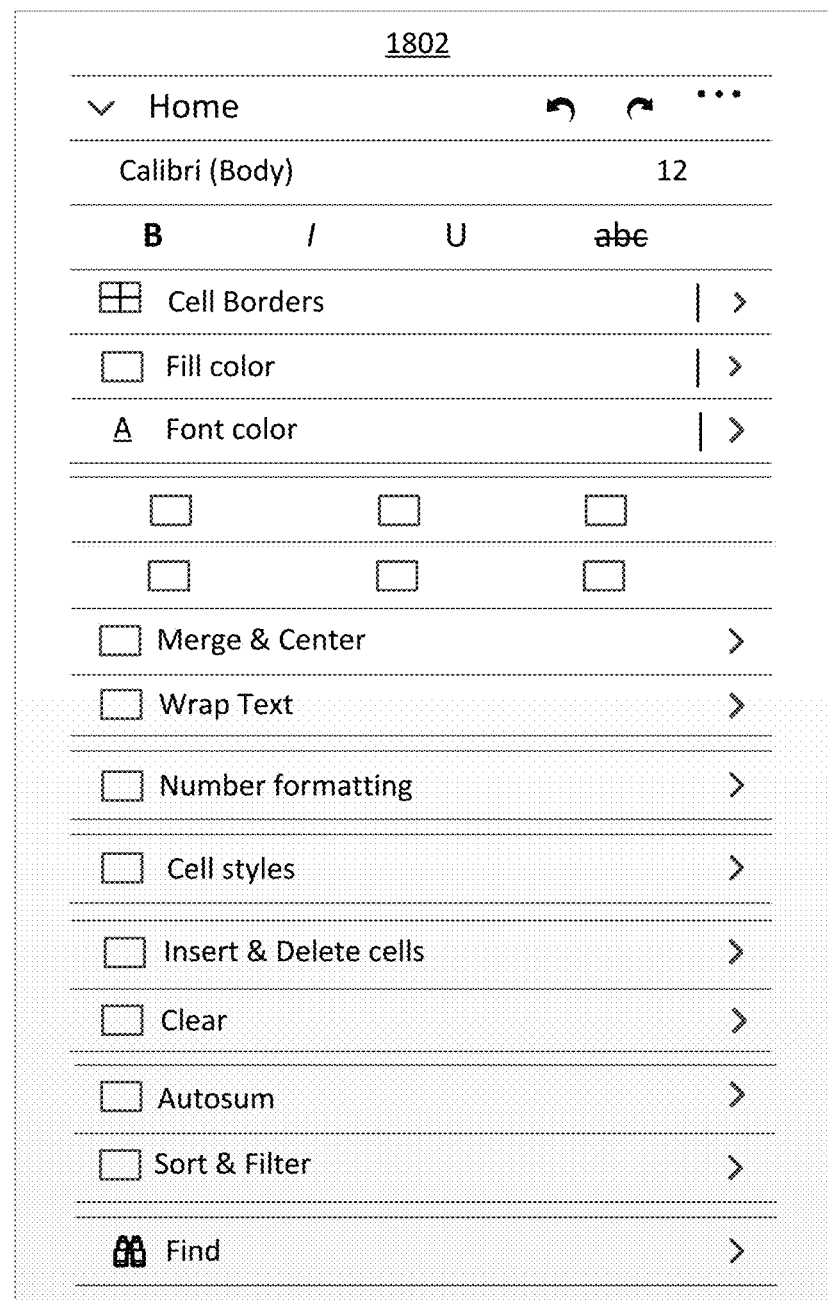
Figure 19:
Figure 20:
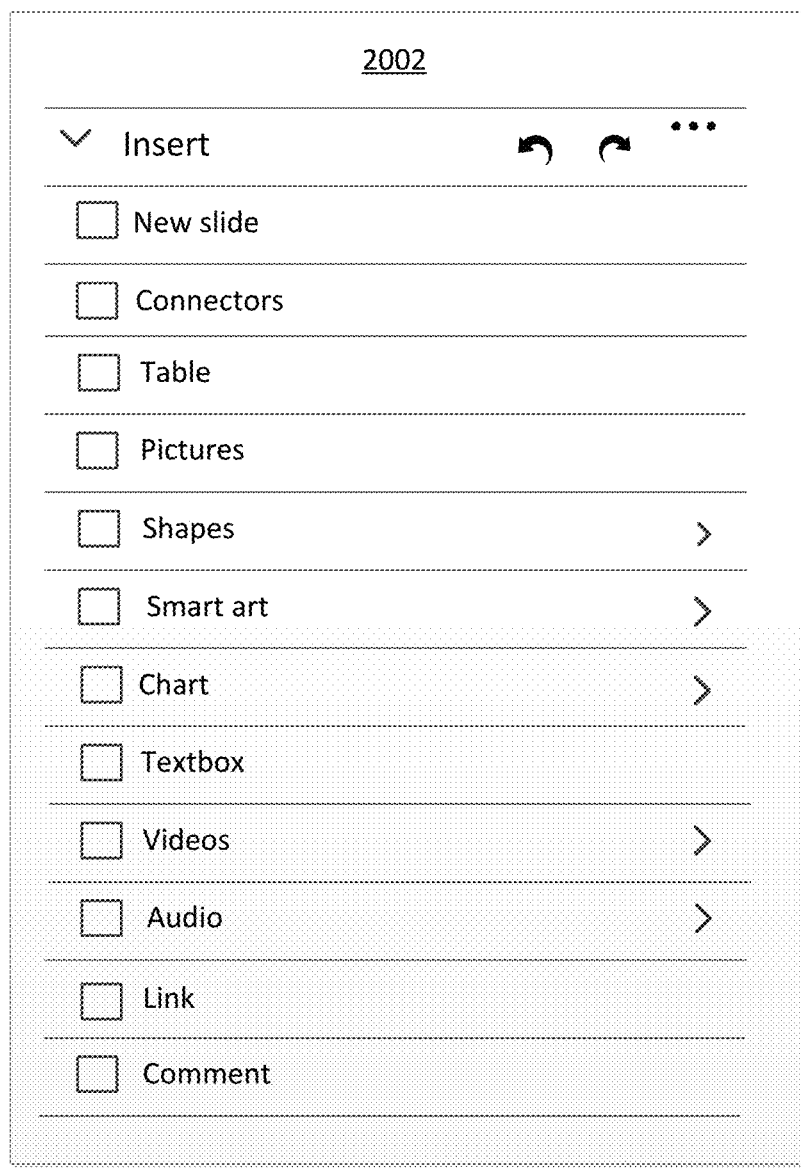

FIGS. 18-20 illustrate additional examples of example palettes that may be displayed by the application command control. Application command control 1802 is an exemplary top-level palette for any applications including a spreadsheet application and a word processing application, among other examples. Application command control 1902 is an exemplary top-level palette for any applications including a word processing application. Application command control 2002 is an exemplary top-level palette for any applications including word processing applications, messaging applications and presentation applications, among other examples.

Figure 21:
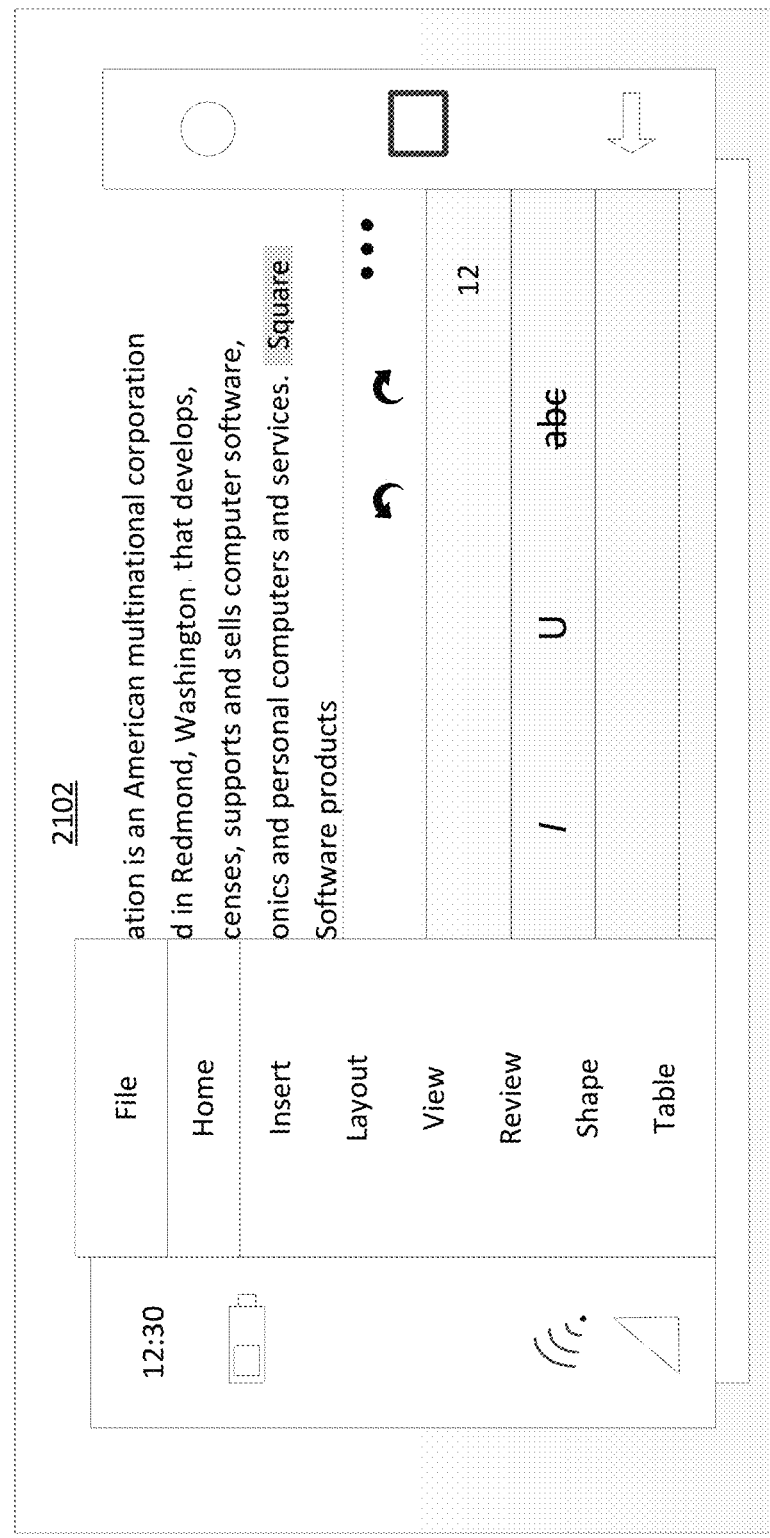
FIG. 21 illustrates a display 2102 including an exemplary application command control with which aspects of the present disclosure may be practiced.

FIG. 21 illustrates a display 2102 including an exemplary application command control. Display 2102 demonstrates that the application command control intelligently adapts content of a palette (e.g., top-level palette or drill-in palette) based on selected content within an application. In one example, a shape object (such as a square) is selected so the options on the palette switcher changed based on the selection. For example, when a share object is selected the "Shape" palette becomes available and is accessible via the palette switcher as shown in FIG. 21. In another example a selection of a word from "square" is highlighted by a user in an application canvas of the display 2102. The application command control interfaces with the application and can intelligently offer suggestions to the user to enhance user experience. For example, a palette displaying a square shape may be displayed when the word "square" is selected in the application. In yet another example, the application command control may launch a search command or search pane (e.g., usage pane) to lookup the word "square" highlighted by the user.

Moreover, the palette may intelligently adapt to launching of applications and software components. For example, when an SIP component such as a virtual keyboard is launched, an application command control may input associated palettes such as text input palettes. In examples, the application command control may detect when a software component such as the SIP is dismissed and can intelligently adapt palette display to return to a palette that was displayed before launching of the SIP, for example.

Non-limiting examples of the present disclosure describe processing devices, computer-implemented methods and computer-readable storage devices associated with launching of an application command control that is programmed for display on small screens when it is detected that a display width associated with the processing device is equal to or less than a threshold value. In examples, the application command control interfacing with an application executing on the processing device and comprising a plurality of top-level palettes and a plurality of drill-in palettes programmed for the application. A top-level palette for the application is vertically scrollable and comprises a collection of rows comprising one or more selectable command elements. A row of the one or more command elements of the top-level palette comprises a drill-in feature that when selected presents a drill-in palette. The drill-in palette is vertically scrollable and comprising one or more rows of selectable command elements. In at least one example, the display width detected corresponds to an operating size of a display window for the application, and the launching determines whether the operating size is equal to or less than a threshold value associated with the operating size. The application command control may intelligently adapt content of at least one of the top-level palette, the drill-in palette, and a palette switcher based on selected content within the application.

In examples, the plurality of top-level palettes and the plurality of drill-in palettes interface with the application, a software input panel of the processing device and at least one pane. The application command control is also programmable to interface with a plurality of applications including the application. Operations executed may further comprise detecting launching of another application, and launching a version of the application command control programmed for the other application when the other application is launched.

In examples, launching comprises launching the application command control in a minimized state hiding palettes of the application command control. Position of the application command control may change based on launching of a soft input panel. The application command control may be displayed at a bottom portion of a display of the processing device. In another example, the application command control comprises at least two parts, a first part displaying at a top portion of a display of the processing device and a second part displaying at a bottom portion of the display of the processing device. The application command control supports a portrait orientation and a landscape orientation for execution with the application, and wherein the operations executed further comprising changing display of the application command control when an orientation of the processing device changes, wherein when the changing of the display of the application command control is changed from a first orientation to a second orientation, the application command control is displayed in a minimized state in the second orientation.

Launching of the application command control may further comprise displaying the top-level palette, and after receiving a selection of the drill-in feature, presenting the drill-in palette along with the top-level palette, wherein the drill-in emerges horizontally from the top-level palette upon selection of the drill-in feature. During an active session of the application where the application command control is launched, the application command control displays a last used palette when the application command control is dismissed and re-invoked or changes from a minimized state to an open state, and the application command control displays the top-level palette of the drill-in palette upon entry into an open state when the last used palette is a drill-in palette and the application command control is placed in a minimized state or the application is exited. Operations executed may further recognizing selection of the drill-in feature, presenting the drill-in palette, recognizing selection of a feature requesting return to the top-level palette and presenting the top-level palette.

In further examples, operations executed comprise setting a layout of at least the top-level palette, wherein the setting further comprises determining commands to include in a row of the top-level palette based on command grouping data and telemetric data, wherein the row of the top-level palette comprises one or more commands up to a determined maximum number of commands that are displayable per row. Setting of the layout further comprises scaling commands in a row when a row to be displayed comprises less than the determined maximum number of commands that are displayable per row. Operations executed may further comprise setting a height for display of a palette, of the plurality of top-level palettes and the plurality of drill-in palettes, and displaying the palette in accordance with the set height for display when the palette is in an open state based on the display width.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A processing device comprising:
   a memory; and
   a processor operatively connected with the memory, the processor executing operations comprising:
   detecting a display width of the processing device is equal to or less than a threshold value;
   based on detecting the display width is equal to or less than the threshold value, launching an application command control for a first application in a first adaptable display configuration, wherein the application command control is dynamically configurable for adaptable display of at least two different application command control portions of the application command control, wherein the first adaptable display configuration comprises a first application command control portion having a first size and a first position and a second application command control portion having a second size and a second position;
   detecting a launching of a second application or a soft input panel (SIP) component; and
   based on the launching of the second application or the SIP component and the display width associated with the processing device, dynamically reconfiguring the application command control in a second display configuration, wherein the second display configuration is based on the second application or the SIP component, wherein the second display configuration comprises at least one of the two different application command control portions in a different size or position.

2. The processing device according to claim 1, wherein the operations executed by the processor further comprises setting a layout of at least a top-level palette that is vertically scrollable and comprises a collection of rows comprising one or more selectable command elements, wherein the setting further comprises determining commands to include in a row of the top-level palette based on command grouping data and telemetric data, and the row of the top-level palette comprises one or more commands up to a determined maximum number of commands that are displayable per row.

3. The processing device according to claim 2, wherein the setting of the layout further comprises scaling the commands in the row when the row to be displayed comprises less than the determined maximum number of commands that are displayable per row.

4. The processing device according to claim 1, wherein the second application command control portion comprises a plurality of top-level palettes and a plurality of drill-in palettes programmed for the first application in which at least one command omitted from a display of a set of commands is included, wherein the operations executed by the processor further comprises setting a height for display of a palette, of the plurality of top-level palettes and the plurality of drill-in palettes, and displaying the palette in accordance with the set height when the palette is in an open state based on the display width.

5. The processing device according to claim 1, wherein the operations executed by the processor further comprises causing the second application command control portion to be displayed in a minimized state hiding palettes of the second application command control portion,
   wherein the second application command control portion comprises a display of a second set of commands and is adapted for display on display areas smaller than large display areas, the second set of commands is a subset of a first set of commands that omits at least one command, and the second application command control portion comprises a plurality of top-level palettes and a plurality of drill-in palettes programmed for the first application in which the at least one command omitted from the display of the second set of commands is included,
   a top-level palette for the first application is vertically scrollable and comprises a collection of rows comprising one or more selectable command elements, and a row of the one or more selectable command elements of the top-level palette comprises a drill-in feature that when selected presents a drill-in palette that is vertically scrollable and comprises one or more rows of the one or more selectable command elements.

6. The processing device according to claim 5, wherein the operations executed by the processor further comprises causing display of the top-level palette, and after receiving a selection of the drill-in feature, causing presentation of the drill-in palette along with the top-level palette, wherein the drill-in palette emerges horizontally from the top-level palette upon the selection of the drill-in feature.

7. The processing device according to claim 1, wherein:
during an active session of the first application where the second application command control portion is caused to be displayed, the second application command control portion displays a last used palette when the second application command control portion is dismissed and re-invoked or changes from a minimized state to an open state, and
when the last used palette is a drill-in palette and the second application command control portion is placed in the minimized state or the first application is exited, the second application command control portion displays a top-level palette of the drill-in palette upon entry into the open state.

8. The processing device according to claim 1, wherein:
a top-level palette for the first application is vertically scrollable and comprises a collection of rows comprising one or more selectable command elements,
a row of the one or more selectable command elements of the top-level palette comprises a drill-in feature that when selected presents a drill-in palette that is vertically scrollable and comprises one or more rows of the one or more selectable command elements, and
the operations executed by the processor further comprises recognizing the selection of the drill-in feature, presenting the drill-in palette, recognizing a selection of a feature requesting return to the top-level palette and presenting the top-level palette.

9. The processing device according to claim 1, wherein:
the second display configuration is based on the first application, second application, and SIP component each having pre-defined variability controls for different sizes or positions of the two different application command control portions, and
the application command control is programmed to be dynamically interact and be displayed simultaneously with the first application, second application, and SIP component.

10. The processing device according to claim 1, wherein the second application command control portion supports a portrait orientation and a landscape orientation for execution with the second application, and the operations executed by the processor further comprises:
changing display of the second application command control portion when an orientation of the processing device changes, and
when the changing of the display of the second application command control portion is changed from a first orientation to a second orientation, the second application command control portion is displayed in a minimized state in the second orientation.

11. The processing device according to claim 1, wherein the second application command control portion is displayed at a bottom portion of a display of the processing device.

12. The processing device according to claim 1, wherein the second application command control portion comprises at least two parts, a first part displaying at a top portion of a display of the processing device and a second part displaying at a bottom portion of the display of the processing device.

13. The processing device according to claim 1, wherein:
the second application command control portion comprises a display of a second set of commands and is adapted for display on display areas smaller than large display areas, wherein the second set of commands is a subset of a first set of commands that omits at least one command,
the second application command control portion comprises a plurality of top-level palettes and a plurality of drill-in palettes programmed for the first application in which the at least one command omitted from the display of the second set of commands is included,
a top-level palette for the first application is vertically scrollable and comprises a collection of rows comprising one or more selectable command elements,
a row of the one or more command selectable elements of the top-level palette comprises a drill-in feature that when selected presents a drill-in palette that is vertically scrollable and comprises one or more rows of the one or more selectable command elements, and
the plurality of top-level palettes and the plurality of drill-in palettes interface with the first application, a software input panel of the processing device and at least one pane.

14. The processing device according to claim 1, wherein the operations executed by the processor further comprises detecting launching of another application, and launching a version of the application command control programmed for the another application when the another application is launched.

15. The processing device according to claim 1, wherein the second application command control portion intelligently adapts content of at least one of a top-level palette, a drill-in palette, and a palette switcher based on selected content within the first application.

16. The processing device according to claim 1, wherein the second size detected corresponds to an operating size of a display window for the first application.

17. A computer-implemented method comprising:
detecting a display width associated with a processing device is equal to or less than a threshold value;
based on detecting the display width is equal to or less than the threshold value, launching an application command control for a first application in a first adaptable display configuration, wherein the application command control is dynamically configurable for adaptable display of at least two different application command control portions of the application command control, wherein the first adaptable display configuration comprises a first application command control portion having a first size and a first position and a second application command control portion having a second size and a second position;
detecting a launching of a second application or a soft input panel (SIP) component; and
based on the launching of the second application or the SIP component and the display width associated with the processing device, dynamically reconfiguring the application command control in a second display configuration, wherein the second display configuration is based on the second application or the SIP component, wherein the second display configuration comprises at least one of the two different application command control portions in a different size or position.

18. The computer-implemented method according to claim 17, wherein the second application command control portion intelligently adapts content of at least one of a top-level palette, a drill-in palette, and a palette switcher based on selected content within the first application.

19. A computer-readable storage hardware device containing instructions, which when executed on a processing device, causing the processing device to execute a process comprising:
  detecting a display width associated with the processing device is equal to or less than a threshold value;
  based on detecting the display width is equal to or less than the threshold value, launching an application command control for a first application in a first adaptable display configuration, wherein the application command control is dynamically configurable for adaptable display of at least two different application command control portions of the application command control, wherein the first adaptable display configuration comprises a first application command control portion having a first size and a first position and a second application command control portion having a second size and a second position;
  detecting a launching of a second application or a soft input panel (SIP) component; and
  based on the launching of the second application or the SIP component and the display width associated with the processing device, dynamically reconfiguring the application command control in a second display configuration, wherein the second display configuration is based on the second application or the SIP component, wherein the second display configuration comprises at least one of the two different application command control portions in a different size or position.

20. The computer-readable storage hardware device according to claim 19, wherein the second application command control portion intelligently adapts content of at least one of a top-level palette, a drill-in palette, and a palette switcher based on selected content within the first application.

* * * * *